US012748218B2

(12) United States Patent
Peng et al.

(10) Patent No.: US 12,748,218 B2
(45) Date of Patent: Sep. 29, 2026

(54) ATMOSPHERIC DELAY CORRECTION FOR NON-TERRESTRIAL NETWORK NODES

(71) Applicant: QUALCOMM Incorporated, San Diego, CA (US)

(72) Inventors: Yuxiang Peng, Sunnyvale, CA (US); Ning Luo, Cupertino, CA (US); Bo Zheng, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 18/518,390

(22) Filed: Nov. 22, 2023

(65) Prior Publication Data

US 2025/0164645 A1 May 22, 2025

(51) Int. Cl.

| | |
|---|---|
| ***G01S 19/40*** | (2010.01) |
| ***G01S 19/43*** | (2010.01) |
| ***H04W 84/06*** | (2009.01) |

(52) U.S. Cl.

CPC ............... *G01S 19/40* (2013.01); *G01S 19/43* (2013.01); *H04W 84/06* (2013.01)

(58) Field of Classification Search

CPC ........................................................ G01S 19/40

See application file for complete search history.

(56) References Cited

U.S. PATENT DOCUMENTS 5,935,196 A * 8/1999 Brodie .................... G01S 19/14 701/13

6,430,498 B1 * 8/2002 Maruyama ............. G01C 21/20 701/526

(Continued)

FOREIGN PATENT DOCUMENTS

CN 114252890 A * 3/2002 ........... G01S 19/241

CN 111624630 B * 2/2022 ............. G01S 19/28

(Continued)

OTHER PUBLICATIONS

Nelson, D. (Ed.). (2008). Singleton (unit set). In The Penguin Dictionary of Mathematics (4th ed.). Penguin. https://search.credoreference.com/articles/Qm9va0FydGljbGU6MTIwNTMyNQ==?aid=279753 (Year: 2008).*

(Continued)

*Primary Examiner* — Resha Desai

*Assistant Examiner* — Fred H Mull

(74) *Attorney, Agent, or Firm* — Procopio, Cory, Hargreaves & Savitch LLP

(57) ABSTRACT

A user equipment (UE) may receive a set of reference signals (RSs) from a set of non-terrestrial network (NTN) nodes. The set of RSs may travel from the set of NTN nodes to the UE through a first portion of an atmosphere and a second portion of the atmosphere. The UE may measure the set of RSs. The UE may calculate, based on the measured set of RSs, a first set of atmospheric delays associated with the first portion of the atmosphere and a second set of atmospheric delays associated with the second portion of the atmosphere. The UE may calculate a location of the UE based on the measured set of RSs, the first set of atmospheric delays, and the second set of atmospheric delays. The UE may transmit the calculated location of the UE. The first portion may include an ionosphere. The second portion may include a troposphere.

30 Claims, 13 Drawing Sheets

(56) References Cited

U.S. PATENT DOCUMENTS

| | | | | |
|---|---|---|---|---|
| 2008/0001818 | A1* | 1/2008 | Cohen | G01S 19/12 342/357.44 |
| 2008/0297408 | A1* | 12/2008 | Dai | G01S 19/44 342/357.38 |
| 2010/0141510 | A1* | 6/2010 | Dai | G01S 19/41 342/357.31 |
| 2019/0250277 | A1* | 8/2019 | Miya | G01S 19/07 |
| 2019/0250278 | A1* | 8/2019 | Huck | G01S 19/14 |
| 2023/0204792 | A1* | 6/2023 | Lawrence | G01S 19/25 342/357.42 |
| 2023/0281288 | A1* | 9/2023 | Kim | G06F 21/33 726/7 |
| 2024/0183998 | A1* | 6/2024 | Zhu | G01S 19/40 |
| 2024/0302532 | A1* | 9/2024 | Reid | G01S 19/05 |

FOREIGN PATENT DOCUMENTS

| | | | | |
|---|---|---|---|---|
| KR | 101667331 B1 | * | 10/2016 | G01S 19/24 |
| WO | WO-2008040896 A2 | * | 4/2008 | G01S 19/40 |

OTHER PUBLICATIONS

M. Markovic, Determination of Total Electron Content in the lonosphere Using GPS Technology, Geonauka, vol. 2, No. 2, p. 1-9 ( Year: 2014).*

A. Flores, Navstar GPS Space Segment/Navigation User Segment Interfaces, IS-GPS-200L, 228 pages (Year: 2020).*

* cited by examiner

ATMOSPHERIC DELAY CORRECTION FOR NON-TERRESTRIAL NETWORK NODES

TECHNICAL FIELD

The present disclosure relates generally to communication systems, and more particularly, to a non-terrestrial network (NTN) wireless communications system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may receive a set of reference signals (RSs) from a set of non-terrestrial network (NTN) nodes. The set of RSs may travel from the set of NTN nodes to the apparatus through a first portion of an atmosphere and through a second portion of the atmosphere. The apparatus may measure the set of RSs. The apparatus may calculate, based on the measured set of RSs, a first set of atmospheric delays associated with the first portion of the atmosphere and a second set of atmospheric delays associated with the second portion of the atmosphere. The apparatus may calculate a location of the UE based on the measured set of RSs, the first set of atmospheric delays, and the second set of atmospheric delays. The apparatus may transmit the calculated location of the UE. The first portion of the atmosphere may be an ionosphere of the atmosphere. The second portion of the atmosphere may be a troposphere of the atmosphere.

The set of NTN nodes may include a set of low-earth orbit (LEO) satellite vehicle (SV) base stations.

The set of NTN nodes may include a set of global navigation satellite system (GNSS) devices. The set of RSs may include a set of GNSS fix measurements based on the set of GNSS receivers. The apparatus may decode the set of RSs to identify the set of GNSS fix measurements corresponding with the set of NTN nodes. The apparatus may calculate the location of the UE by calculating the location of the UE further based on the set of GNSS fix measurements.

The set of GNSS fix measurements may include a set of measurements in an observation space representation (OSR) format.

The set of measurements may include at least one of (a) a set of pseudorange measurements, (b) a set of carrier phase measurements, (c) a set of Doppler measurements, or (d) a set of carrier-to-noise density power ratio (CN0) measurements.

The apparatus may calculate the location of the UE further based on the set of GNSS fix measurements by correcting, based on the set of GNSS fix measurements, at least one of (a) a ranging error, (b) a satellite vehicle (SV) clock error, (c) an orbital path error, (d) a code bias error, or (e) a phase bias error.

The first set of atmospheric delays may include an ionosphere delay.

The set of RSs may include at least one RS including a plurality of radio frequencies (RFs). The apparatus may calculate the first set of atmospheric delays based on the measured set of RSs by calculating a first total electron content (TEC) associated with a first time based on a first set of range measurements associated with a first RF of the plurality of RFs and a second set of range measurements associated with a second RF of the plurality of RFs.

The apparatus may calculate the first set of atmospheric delays based on the measured set of RSs by calculating a rate of TEC (ROT) based on the first TEC associated with the first time and a second TEC associated with a second time.

The apparatus may calculate at least one of a set of ionosphere delay rates or a set of ROTs based on the measured set of RSs. The apparatus may select a first subset of the set of ionosphere delay rates based on the first subset being less than or equal to a threshold or may select a second subset of the set of ROTs based on the second subset being less than or equal to the threshold. The apparatus may calculate the first set of atmospheric delays by calculating the first set of atmospheric delays based on at least one of the first subset or the second subset.

The apparatus may calculate the first set of atmospheric delays based on at least one of the first subset or the second subset by calculating an elevation angle of at least one NTN node of the set of NTN nodes, by calculating an ionosphere slant factor (SF) based on the elevation angle, and by calculating the first set of atmospheric delays further based on the calculated ionosphere SF.

The second set of atmospheric delays may include a troposphere delay.

The set of RSs may include at least one RS including a plurality of RFs. The apparatus may calculate the second set of atmospheric delays based on the measured set of RSs by calculating a TEC based on a first set of range measurements associated with a first RF of the plurality of RFs and a second set of range measurements associated with a second RF of the plurality of RFs.

The apparatus may calculate the second set of atmospheric delays based on the measured set of RSs by calculating at least one of the second set of atmospheric delays based on (a) a range measurement between the UE and at least one NTN node of the set of NTN nodes, (b) the TEC. (c) a georange measurement between the UE and the at least one NTN node of the set of NTN nodes, and (d) a time of transmission.

The apparatus may calculate the second set of atmospheric delays based on the measured set of RSs by calculating an elevation angle of at least one NTN node of the set of NTN nodes, by calculating a troposphere SF based on the elevation angle, and by calculating the first set of atmospheric delays further based on the calculated troposphere SF.

The apparatus may calculate an elevation angle for each of the set of NTN nodes. The apparatus may select a first subset of the set of NTN nodes based on the elevation angle being greater than or equal to a threshold. The apparatus may calculate the first set of atmospheric delays based on the measured set of RSs by calculating the first set of atmospheric delays based on a second subset of the measured set of RSs associated with the selected first subset of the set of NTN nodes.

The apparatus may calculate an elevation angle for each of the set of NTN nodes. The apparatus may weight the measured set of RSs based on the calculated elevation angle.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
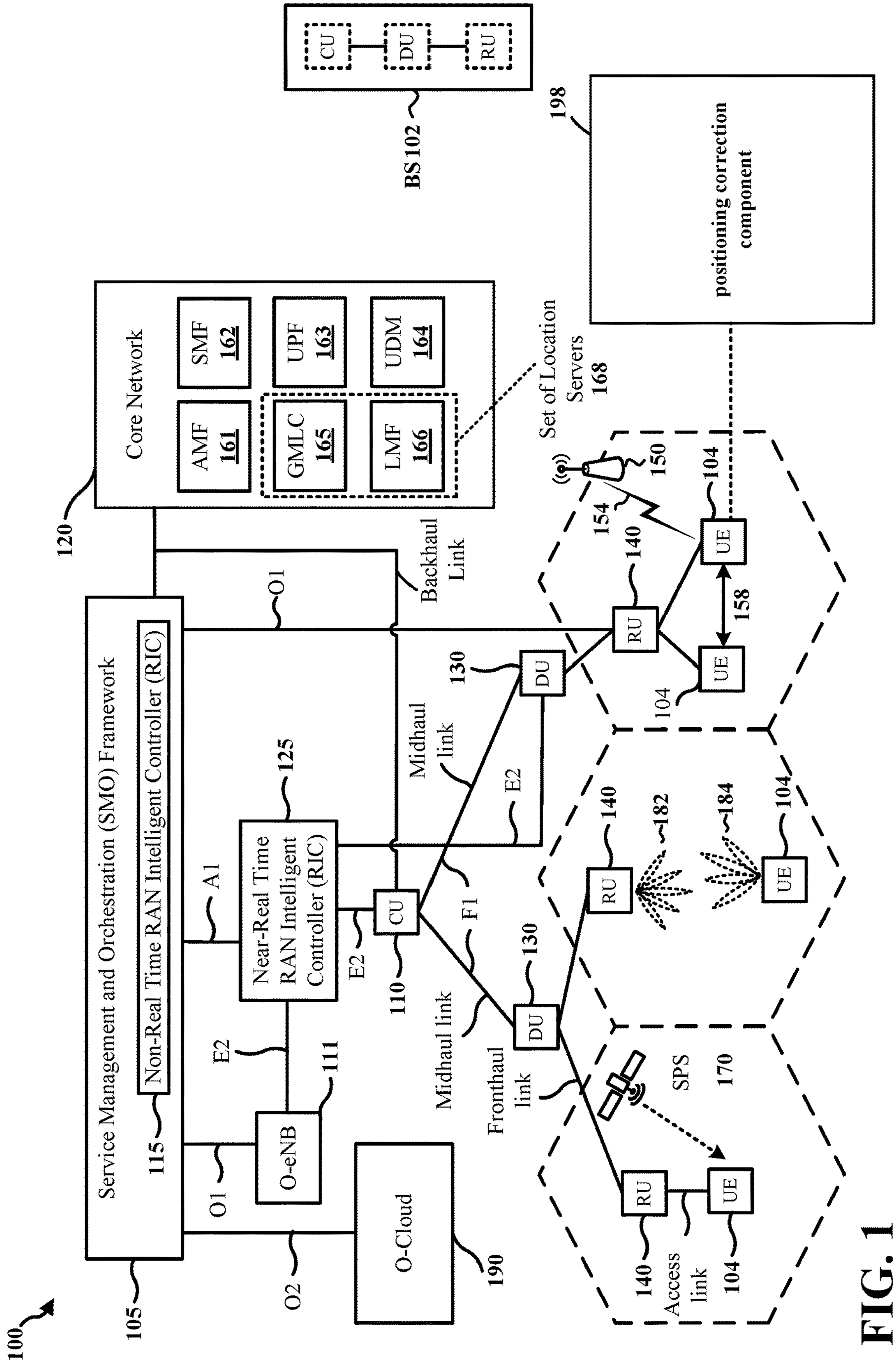
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to a wireless positioning system. Some aspects more specifically relate to wireless positioning based on signals received from non-terrestrial network (NTN) nodes. In some examples, a user equipment (UE) may receive a set of reference signals (RSs) from a set of non-terrestrial network (NTN) nodes. The set of RSs may travel from the set of NTN nodes through a first portion of an atmosphere and a second portion of the atmosphere to reach the UE. The UE may measure the set of RSs. The UE may calculate, based on the measured set of RSs, a first set of atmospheric delays associated with the first portion of the atmosphere and a second set of atmospheric delays associated with the second portion of the atmosphere. The UE may calculate a location of the UE based on the measured set of RSs, the first set of atmospheric delays, and the second set of atmospheric delays. The UE may transmit the calculated location of the UE, for example to a terrestrial base station or to a location management function (LMF). The NTN node may include a low-earth orbit (LEO) satellite. The NTN node may include an LEO satellite vehicle (SV) base station.

In some aspects, an NTN node may be used as a real-time kinematic (RTK) base station by equipping the NTN node with a global network satellite system (GNSS) receiver. However, the atmospheric effects for a UE at ground level and an NTN node orbiting the Earth may not be the same. For example, a signal that travels between the UE and the NTN node may travel through an ionosphere and a troposphere, which may subject the signal to a delay, unlike a signal that travels between the UE and a terrestrial base station. In some aspects, a UE doing RTK using an NTN node as a base station may apply a first RTK correction for a non-atmospheric impact and a second RTK correction for an atmospheric impact (e.g., travel through an ionosphere/troposphere). The second RTK correction for the atmospheric impact may be based on the UE's estimates of the ionosphere total electron content (TEC), ionosphere delay rate, rate of TEC (ROT), and/or troposphere delay with respect to the NTN node.

Particular aspects of the subject matter described in this disclosure can be implemented to realize one or more of the following potential advantages. In some examples, by configuring a UE to calculate a first set of atmospheric delays associated with a first portion of an atmosphere and a second set of atmospheric delays associated with a second portion of the atmosphere, the described techniques can be used to improve the performance of RTK positioning with NTN nodes. A set of NTN nodes may be configured with low-power spaceborne GNSS receivers in their payload, allowing the set of NTN nodes to act as a global RTK moving base station network, even if the set of NTN nodes include LEO satellites. UEs configured to perform positioning with the set of NTN nodes may calculate a first set of atmospheric delays associated with a first portion of the atmosphere (e.g., an ionosphere) and a second set of atmospheric delays associated with a second portion of the atmosphere (e.g., a troposphere) to rapidly calculate a location of the UE based on measuring positioning signals that travel through the first portion of the atmosphere and the second portion of the atmosphere to reach the UE from the set of NTN nodes.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors. The SPS 170 may include an RU or a DU of a network node.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a positioning correction component 198 that may be configured to receive a set of RSs from a set of NTN nodes. The set of RSs may travel from the set of NTN nodes to the apparatus through a first portion of an atmosphere (e.g., an ionosphere) and through a second portion of the atmosphere (e.g., a troposphere). The positioning correction component 198 may be configured to measure the set of RSs. The positioning correction component 198 may be configured to calculate, based on the measured set of RSs, a first set of atmospheric delays associated with the first portion of the atmosphere and a second set of atmospheric delays associated with the second portion of the atmosphere. The positioning correction component 198 may be configured to calculate a location of the UE 104 based on the measured set of RSs, the first set of atmospheric delays, and the second set of atmospheric delays. The positioning correction component 198 may be configured to transmit the calculated location of the UE 104. In other words, the positioning correction component 198 may be configured to calculate a location of the UE 104 based on a first correction of atmospheric delays within the ionosphere and on a second correction of atmospheric delays within the troposphere, where the first correction and second correction are calculated in a different manner from one another.

Figures 2A, 2B, 2C, 2D:
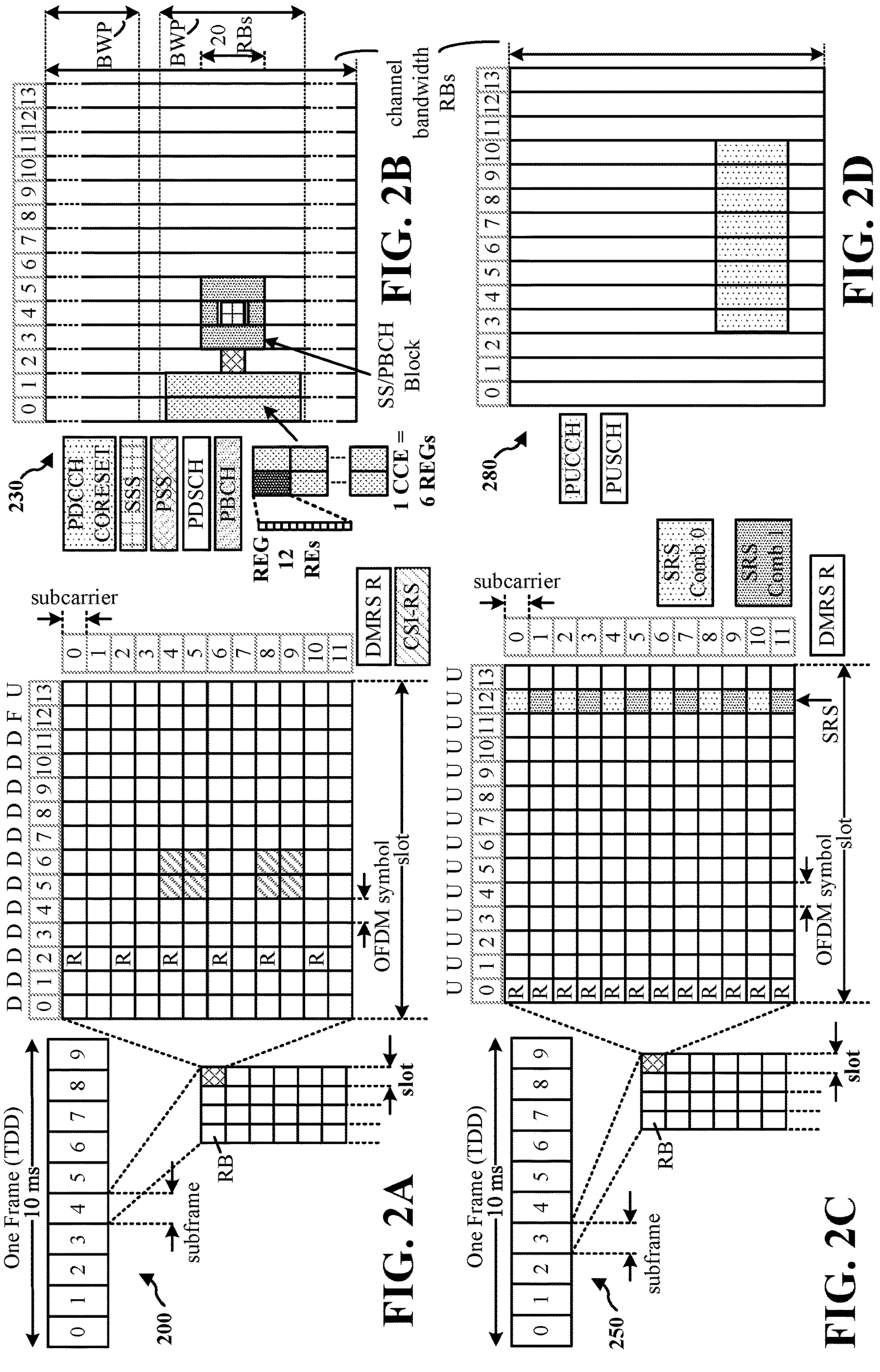
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
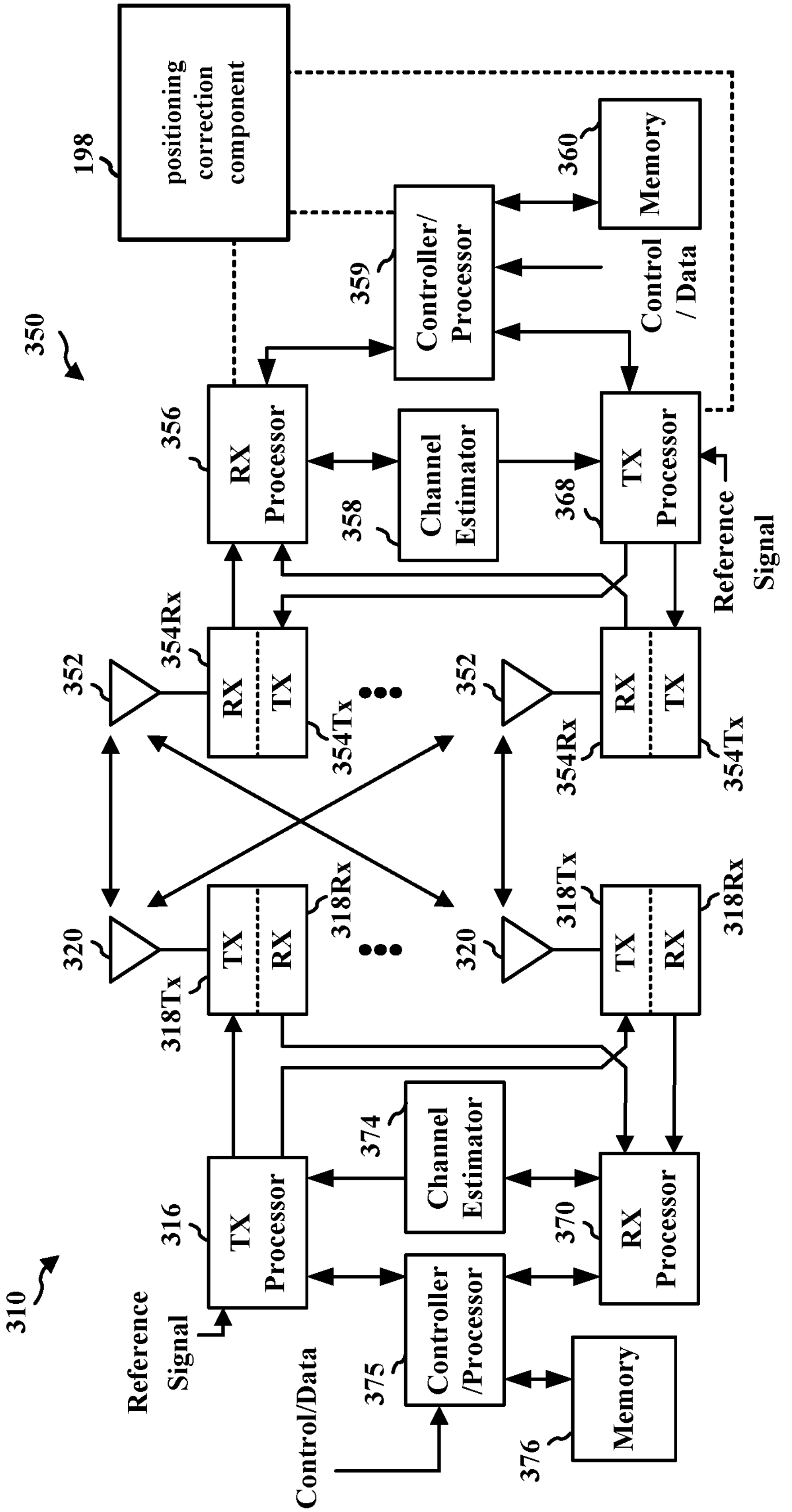
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning correction component 198 of FIG. 1.

Figure 4A:
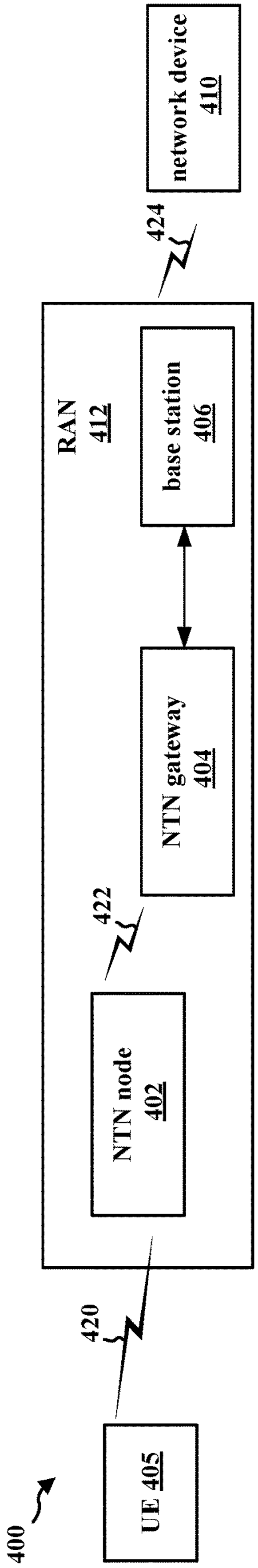
FIGS. 4A, 4B, and 4C illustrate example aspects of a network architecture that supports communication via an NTN node, in accordance with various aspects of the present disclosure.
Figure 4B:
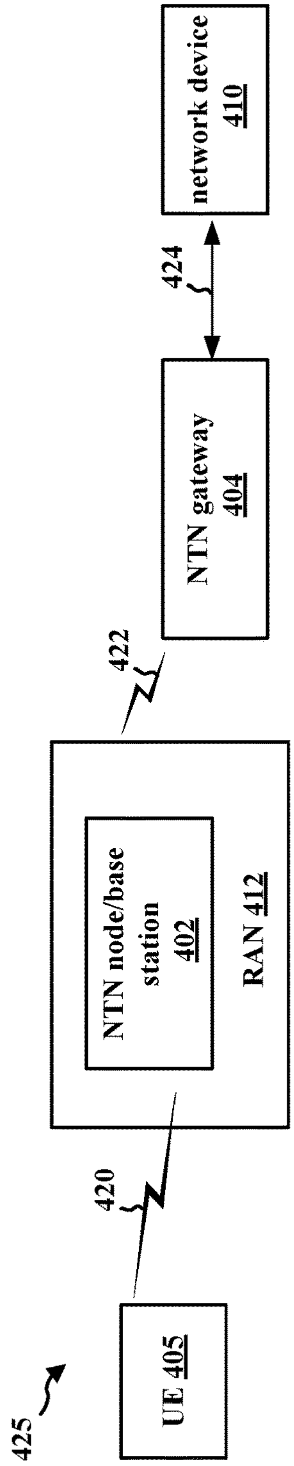
Figure 4C:
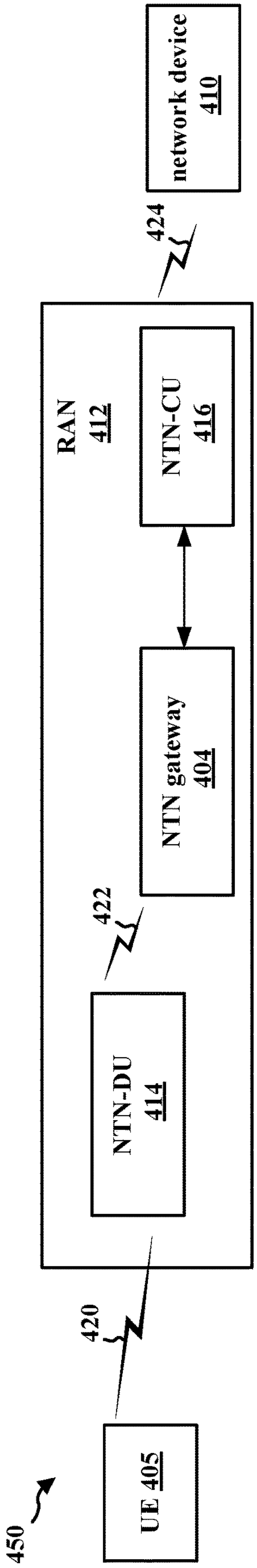

In some aspects, a network node configured to communicate with a UE may include a, NTN node. FIGS. 4A, 4B, and 4C illustrated example network architecture that supports UE communication via an NTN node.

FIG. 4A illustrates an example network architecture 400 that may have the capability to support NTN access, e.g., using 5G NR, 3G, 4G LTE. The network architecture 400 of FIG. 4A includes a UE 405, an NTN node 402, an NTN gateway 404 (sometimes referred to as "gateways," "earth stations," or "ground stations"), and a base station 406 having the capability to communicate with the UE 405 via the NTN node 402. The NTN node 402, the NTN gateway 404, and the base station 406 may be part of a RAN 412 (e.g., an NG RAN). An NTN gateway may be a gateway to connect a terrestrial public data network to a non-terrestrial network. An NTN gateway may support functions to forward a signal from an NTN device/node to a universal mobile telecommunications system (UMTS) terrestrial radio access (UTRA) to UE (Uu) interface, such as an NR-Uu interface or an LTE-Uu interface. An NTN gateway may provide a transport network layer node, and may support transport protocols, such as acting as an IP router. In some aspects, a base station may include an NTN gateway. As an example, the base station 102 may include an NTN gateway for communication with a satellite, for example the SPS 170 or a base station 102 located in orbit around the Earth. In some aspects, a satellite may include an NTN gateway for communication with the base station 102. In some aspects, both the base station 102 and a satellite may include components of an NTN gateway.

The base station 406 may be a network node that corresponds to the base station 102 in FIG. 1. The network architecture 400 is illustrated as further including a network device 410. In some aspects, the network device 410 may include a number of Fifth Generation (5G) networks including 5G Core Networks (5GCNs) and may correspond to the core network 120 described in connection with FIG. 1. The network device 410 may include a public land mobile network (PLMN). In some aspects, the network device 410 may bridge the base RAN 412 with a core network, such as the core network 120 of FIG. 1.

Permitted connections in the network architecture 400 with transparent payloads illustrated in FIG. 4A, may allow the base station 406 to access the NTN gateway 404 and the network device 410. In some examples, the base station 406 may be shared by multiple PLMNs. Similarly, the NTN gateway 404 may be shared by more than one base station.

FIG. 4A provides a generalized illustration of various components, any or all of which may be utilized as appropriate, and each of which may be duplicated or omitted, as necessary. Specifically, although the example of FIG. 4A includes one UE 405, it should be understood that many UEs (e.g., hundreds, thousands, millions, etc.) may utilize the network architecture 400. As an example, a plurality of UEs may connect with the NTN node 402 via a plurality of service links similar to service link 420. Similarly, the network architecture 400 may include a larger (or smaller) number of NTN nodes, NTN gateways, base stations, RAN, core networks, and/or other components. The illustrated connections that connect the various components in the network architecture 400 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 405 may be configured to communicate with the network device 410 via the NTN node 402, the NTN gateway 404, and the base station 406. As illustrated by the RAN 412, one or more RANs associated with the network device 410 may include one or more base stations. Access to the network may be provided to the UE 405 via wireless communication between the UE 405 and the base station 406 (e.g., a serving base station), via the NTN node 402 and the NTN gateway 404. The base station 406 may provide wireless communications access to the network device 410 on behalf of the UE 405, e.g., using 5G NR, 3G, 4G LTE.

The base station 406 may be referred to by other names such as a network entity, a gNB, a "satellite node," a satellite NodeB (sNB), "satellite access node," an NTN node, etc. The base station 406 may not be the same as terrestrial network gNBs, but may be based on a terrestrial network gNB with additional capabilities. As an example, the base station 406 may facilitate the radio interface and associated radio interface protocols to the UE 405 and may transmit DL signals to the UE 405 and receive UL signals from the UE 405 via the NTN node 402 and the NTN gateway 404. The base station 406 may also support signaling connections and voice and data bearers to the UE 405 and may support handover of the UE 405 between different radio cells for the NTN node 402, between different NTN nodes and/or between different base stations. The base station 406 may be configured to manage moving radio beams (e.g., for airborne vehicles, non-geostationary (non-GEO) devices, LEO devices) and associated mobility of the UE 405. The base station 406 may assist in the handover (or transfer) of the NTN node 402 between different NTN gateways or different base stations. In some examples, the base station 406 may be separate from the NTN gateway 404, e.g., as illustrated in the example of FIG. 4A. In other examples, the base station 406 may include or may be combined with one or more NTN gateways, e.g., using a split architecture. As an example, with a split architecture, the base station 406 may include a Central Unit (CU), such as the example CU 110 of FIG. 1, and the NTN gateway 404 may include or act as Distributed Unit (DU), such as the example DU 130 of FIG. 1. The base station 406 may be fixed on the ground with transparent payload operation. In one implementation, the base station 406 may be physically combined with, or physically connected to, the NTN gateway 404 to reduce complexity and cost.

The NTN gateway 404 may be shared by more than one base station and may communicate with the UE 405 via the NTN node 402. The NTN gateway 404 may be dedicated to one associated constellation of NTN devices. The NTN gateway 404 may be included within the base station 406, e.g., as a base station-DU within the base station 406. The NTN gateway 404 may communicate with the NTN node 402 using control and user plane protocols. The control and user plane protocols between the NTN gateway 404 and the NTN node 402 may: (i) establish and release the NTN gateway 404 to the NTN node 402 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN node 402 or radio cell to another NTN gateway.

Support of transparent payloads with the network architecture 400 shown in FIG. 4A may impact the communication system in a variety of ways. The network device 410 may treat a satellite RAT as a new type of RAT with longer delay, reduced bandwidth and/or higher error rate. Consequently, there may be some impact to PDU session establishment and mobility management (MM) and connection management (CM) procedures. The NTN node 402 may be shared with other services (e.g., satellite television, fixed Internet access) with 5G NR mobile access for UEs added in a transparent manner. This may enable legacy NTN nodes to be used and may avoid deploying a new type of NTN node. The base station 406 may assist assignment and transfer of the NTN node 402 and radio cells between the base station 406 and the NTN gateway 404 and support handover of the UE 405 between radio cells, NTN nodes, and other base stations. Thus, the base station 406 may differ from a terrestrial network gNB. Additionally, a coverage area of the base station 406 may be much larger than the coverage area of a terrestrial network base station.

In the illustrated example of FIG. 4A, a service link 420 may facilitate communication between the UE 405 and the NTN node 402, a feeder link 422 may facilitate communication between the NTN node 402 and the NTN gateway 404, and an interface 424 may facilitate communication between the base station 406 and the network device 410. The service link 420 and the feeder link 422 may be implemented by a same radio interface (e.g., a Uu interface, such as an NR-Uu or an LTE-Uu interface). The interface 424 may be implemented by an NG interface or an LTE interface.

FIG. 4B shows a diagram of a network architecture 425 may have the capability to support NTN access, e.g., using 5G NR, as presented herein. The network architecture 425 shown in FIG. 4B is similar to that shown in FIG. 4A, with like designated elements being similar or the same. FIG. 4B, however, illustrates a network architecture with regenerative payloads, as opposed to transparent payloads shown in FIG. 4A. A regenerative payload, unlike a transparent payload, includes an on-board base station (e.g., includes the functional capability of a base station), and is referred to herein as an NTN node 402/base station. The on-board base station may be a network node that corresponds to the base station 102 in FIG. 1. The RAN 412 is illustrated as including the NTN node 402/base station. Reference to the NTN node 402/base station may refer to functions related to communication with the UE 405 and the network device 410 and/or to functions related to communication with the NTN gateway 404 and with the UE 405 at a physical radio frequency level.

An on-board base station may perform many of the same functions as the base station 406 as described previously. As an example, the NTN node 402/base station may terminate the radio interface and associated radio interface protocols to the UE 405 and may transmit DL signals to the UE 405 and receive UL signals from the UE 405, which may include encoding and modulation of transmitted signals and demodulation and decoding of received signals. The NTN node 402/base station may also support signaling connections and voice and data bearers to the UE 405 and may support handover of the UE 405 between different radio cells for the NTN node 402/base station and between or among different NTN device/base stations. The NTN node 402/base station may assist in the handover (or transfer) of the UE 405 between different NTN gateways and different control networks. The NTN node 402/base station may hide or obscure specific aspects of the NTN node 402/base station from the network device 410, e.g., by interfacing to the network device 410 in the same way or in a similar way to a terrestrial network base station. The NTN node 402/base station may further assist in sharing of the NTN node 402/base station. The NTN node 402/base station may communicate with one or more NTN gateways and with one or more core networks via the NTN gateway 404. In some aspects, the NTN node 402/base station may communicate directly with other NTN device/base stations using Inter-Satellite Links (ISLs), which may support an Xn interface between any pair of NTN device/base stations.

With NTN devices or satellites, the NTN node 402/base station may manage moving radio cells with coverage at different times. The NTN gateway 404 may be connected directly to the network device 410, as illustrated. The NTN gateway 404 may be shared by multiple core networks, as an example, if NTN gateways are limited. In some examples, the network device 410 may be aware of coverage area(s) of the NTN node 402/base station in order to page the UE 405 and to manage handover. Thus, as can be seen, the network architecture 425 with regenerative payloads may have more impact and complexity with respect to both the NTN node 402/base station and the network device 410 than the network architecture 400 including transparent payloads, as shown in FIG. 4A.

Support of regenerative payloads with the network architecture 425 shown in FIG. 4B may impact the network architecture 425 in a variety of ways. The network device 410 may be impacted if fixed tracking areas and fixed cells are not supported, as core components of mobility management and regulatory services, which are based on fixed cells and fixed tracking areas for terrestrial PLMNs, may be replaced by a different system (e.g., based on a location of the UE 405). If fixed tracking areas and fixed cells are supported, the network device 410 may map a fixed tracking area to one or more NTN device/base stations with current radio coverage of the fixed tracking area when performing paging of the UE 405 that is located in this fixed tracking area. This may include configuration in the network device 410 of long term orbital data for the NTN node 402/base station (e.g., obtained from an operator of the NTN node 402/base station) and may add impacts to network device 410.

In the illustrated example of FIG. 4B, a service link 420 may facilitate communication between the UE 405 and the NTN node 402/base station, a feeder link 422 may facilitate communication between the NTN node 402/base station and the NTN gateway 404, and an interface 424 may facilitate communication between the NTN gateway 404 and the network device 410. The service link 420 may be implemented by an NR-Uu interface. The feeder link 422 may be implemented by an NG interface over SRI. The interface 424 may be implemented by an NG interface.

FIG. 4C shows a diagram of a network architecture 450 that may have the capability to support NTN access, e.g., using 5G NR, as presented herein. The network architecture shown in FIG. 4C is similar to that shown in FIGS. 4A and 4B, like designated elements being similar or the same. FIG. 4C, however, illustrates a network architecture with regenerative payloads, as opposed to transparent payloads, as shown in FIG. 4A, and with a split architecture for the base station. As an example, the base station may be split between a central unit (CU), such as the CU 110 of FIG. 1, and a distributed unit (DU), such as the DU 130 of FIG. 1. In the illustrated example of FIG. 4C, the network architecture 450 includes an NTN-CU 416, which may be a ground-based base station or a terrestrial base station. The regenerative payloads include an on-board base station DU, and is referred to herein as an NTN-DU 414. The NTN-CU 416 and the NTN-DU 414, collectively or individually, may correspond to the network node associated with the base station 102 in FIG. 1.

The NTN-DU 414 communicates with the NTN-CU 416 via the NTN gateway 404. The NTN-CU 416 together with the NTN-DU 414 perform functions, and may use internal communication protocols, which are similar to or the same as a gNB with a split architecture. In the example, the NTN-DU 414 may correspond to and perform functions similar to or the same as a gNB distributed unit (gNB-DU), while the NTN-CU 416 may correspond to and perform functions similar to or the same as a gNB Central Unit (gNB-CU). However, the NTN-CU 416 and the NTN-DU 414 may each include additional capability to support the UE 405 access using NTN devices.

The NTN-DU 414 and the NTN-CU 416 may communicate with one another using an F1 Application Protocol (F1AP), and together may perform some or all of the same functions as the base station 406 or the NTN node 402/base station as described in connection with FIGS. 4B and 4C, respectively.

The NTN-DU 414 may facilitate the radio interface and associated lower level radio interface protocols to the UE 405 and may transmit DL signals to the UE 405 and receive UL signals from the UE 405, which may include encoding and modulation of transmitted signals and demodulation and decoding of received signals. The operation of the NTN-DU 414 may be partly controlled by the NTN-CU 416. The NTN-DU 414 may support one or more NR radio cells for the UE 405. The NTN-CU 416 may also be split into separate control plane (CP) (NTN-CU-CP) and user plane (UP) (NTN-CU-UP) portions. The NTN-DU 414 and the NTN-CU 416 may communicate over an F1 interface to (a) support control plane signaling for the UE 405 using IP, Stream Control Transmission Protocol (SCTP) and F1 Application Protocol (F1AP) protocols, and (b) to support user plane data transfer for a UE using IP, User Datagram Protocol (UDP), PDCP. SDAP. GTP-U and NR User Plane Protocol (NRUPP) protocols.

The NTN-CU 416 may communicate with one or more other NTN-CUs and/or with one more other terrestrial base stations using terrestrial links to support an Xn interface between any pair of NTN-CUs and/or between the NTN-CU 416 and any terrestrial base station.

The NTN-DU 414 together with the NTN-CU 416 may: (i) support signaling connections and voice and data bearers to the UE 405; (ii) support handover of the UE 405 between different radio cells for the NTN-DU 414 and between different NTN-DUs; and (iii) assist in the handover (or transfer) of NTN devices between different NTN gateways or different core networks. The NTN-CU 416 may hide or obscure specific aspects of the NTN devices from the network device 410, e.g., by interfacing to the network device 410 in the same way or in a similar way to a terrestrial network base station.

In the network architecture 450 of FIG. 4C, the NTN-DU 414 that communicates with and is accessible from an NTN-CU may change over time with LEO devices. With the split base station architecture, the network device 410 may connect to NTN-CUs that are fixed and that do not change over time, which may reduce difficulty with paging of the UE 405. As an example, the network device 410 may not know which NTN-DU is used for paging the UE 405. The network architecture with regenerative payloads with a split base station architecture may thereby reduce the network device 410 impact at the expense of additional impact to the NTN-CU 416.

Support of regenerative payloads with a split base station architecture, as shown in FIG. 4C, may impact the network architecture 450 in a variety of ways. The impact to the network device 410 may be limited as for the transparent payloads (e.g., the NTN node 402) discussed above. As an example, the network device 410 may treat a satellite RAT in the network architecture 450 as a different type of RAT with longer delay, reduced bandwidth and/or higher error rate. The impact on the NTN-DU 414 may be less than the impact on NTN device/base stations (e.g., the NTN node 402/base station with a non-split architecture), as discussed above in reference to FIG. 4B. The NTN-DU 414 may manage changing association with different (fixed) NTN-CUs. Further, the NTN-DU 414 may manage radio beams and radio cells. The NTN-CU 416 impacts may be similar to the impact of the base station 406 for a network architecture with transparent payloads, as discussed above, except for extra impacts to manage changing associations with different NTN-DUs and reduced impacts to support radio cells and radio beams, which may be transferred to the NTN-DU 414. In some aspects, the NTN node may correspond to a high altitude platform system (HAPS) that serves one or more UEs on the ground. In some aspects, the NTN node may correspond to a LEO that serves one or more UEs on the ground.

One or more satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may be configured to help to provide wireless communication in un-served or underserved areas to upgrade the performance of terrestrial networks. As an example, a communication satellite may provide coverage to a larger geographic region than a terrestrial network (TN) base station. The NTN may also reinforce service reliability by providing service continuity for UEs or for moving platforms (e.g., passenger vehicles-aircraft, ships, high speed trains, buses). The NTN may also increase service availability, including important communications. The NTN may also enable network scalability through the provision of efficient multicast/broadcast resources for data delivery towards the network edges or even directly to the user equipment.

Figure 5:
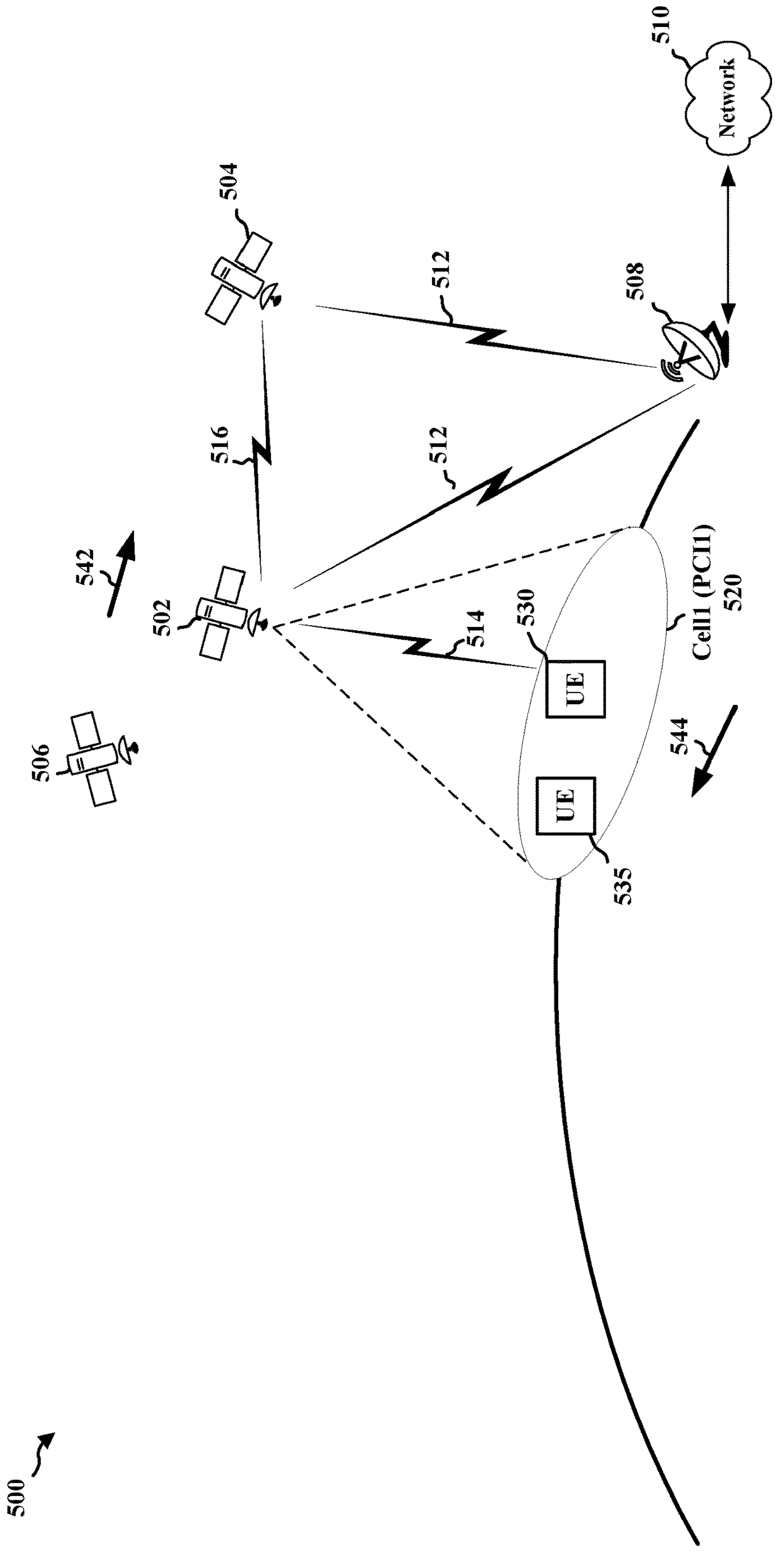
FIG. 5 illustrates an example of an NTN configuration, in accordance with various aspects of the present disclosure.

FIG. 5 illustrates an example of a configuration for an NTN 500. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. As an example, a communication satellite may include a GEO device that appears stationary with respect to the Earth. As such, a single GEO device may provide coverage to a geographic coverage area. In other examples, a communication satellite may include a non-GEO device, such as a LEO device, an MEO device, or an HEO device. Non-GEO devices may not appear stationary with respect to the Earth. As such, a satellite constellation (e.g., one or more satellites) having at least one non-GEO devices may be configured to provide coverage to a geographic coverage area. An airborne vehicle may refer to a system encompassing tethered UAS (TUA), lighter than air UAS (LTA), heavier than air UAS (HTA), e.g., in altitudes typically between 8 and 50 km including high altitude platforms (HAPs).

In some aspects, the NTN 500 may include an NR-NTN. The example of FIG. 5 provides that the NTN 500 may include an NTN node 502, an NTN node 504, an NTN node 506, an NTN gateway 508, a data network 510, and a UE 530 within a cell coverage of the NTN node 502. In some aspects, the UE 530 may include IoT devices, and the UE may be connected to the NTN 500 for wireless communication. The data network 510 may be any network capable of transmitting data with devices, such as a public data network (e.g., the core network 120 in FIG. 1).

The NTN gateway 508 may include one of one or more NTN gateways that may connect the NTN 500 to a public data network, as an example, the data network 510. In some examples, the NTN gateway 508 may support functions to forward a signal from the NTN node to a Uu interface, such as an NR-Uu interface. In other examples, the NTN gateway 508 may provide a transport network layer node, and may support transport protocols, such as acting as an IP router. A satellite radio interface (SRI) may provide IP trunk connections between the NTN gateway 508 and the NTN node to transport NG or F1 interfaces, respectively. One or more NTN nodes (e.g., which may be referred to herein as the NTN node 502, the NTN node 504, or the NTN node 506) may be fed by the NTN gateway 508, and the one or more NTN nodes may be deployed across the satellite targeted coverage, which may correspond to regional coverage or even continental coverage. The NTN nodes may include GEO devices or non-GEO devices, which may be served successively by one or more NTN gateways at a time, and the NTN 500 may be configured to provide service and feeder link continuity between the successive serving NTN gateways with time duration to perform mobility anchoring and handover.

The NTN node 502, which may include spaceborne vehicles or airborne vehicles, may communicate with the data network 510 through a feeder link 512 established between the NTN node 502 and the NTN gateway 508 in order to provide service to the UE 530 within the cell coverage, or a field-of-view of an NTN cell 520, of the NTN node 502 via a service link 514. The feeder link 512 may include a wireless link between an NTN gateway and an NTN node. The service link 514 may refer to a radio link between an NTN node (e.g., the NTN node 502) and the UE 530. As described in connection with FIG. 1, the NTN node 502 may use one or more directional beams, e.g., beamforming, to exchange communication with the UE 530. A beam may refer to a wireless communication beam generated by an antenna on-board an NTN node. The service link 514 may include an UL signal, a DL signal, or a positioning signal.

In some examples, the UE 530 may communicate with the NTN node 502 via the service link 514. The NTN node 504 may relay the communication for the NTN node 502 through an inter-satellite link (ISL) 516, and the NTN node 504 may communicate with the data network 510 through the feeder link 512 established between the NTN node 504 and the NTN gateway 508. The ISL links may be provided between a constellation of satellites and may involve the use of transparent payloads on-board the NTN nodes. The ISL may operate in an RF frequency or an optical band.

In the illustrated example of FIG. 5, the NTN node 502 may provide the NTN cell 520 with a first physical cell ID (PCI) ("PCI1"). The NTN node 502 may serve a plurality of UEs within the NTN cell 520, for example the UE 530 and the UE 535. In one aspect, the NTN node 502 may be a GEO device appears stationary with respect to the Earth. In such an example, the NTN node 502 may not move in the direction 542 with respect to objects located on the surface of the Earth, such as the UE 530. In other aspects, a constellation of satellites may provide coverage to the NTN cell 520. As an example, the NTN node 502 may include a non-GEO device that does not appear stationary with respect to the Earth. In such an example, the NTN node 502 may move in the direction 542 with respect to objects located on the surface of the Earth, such as the UE 530, or the UE 530 may move in the direction 544 with respect to the NTN node 502. As such, a satellite constellation (e.g., one or more satellites) may be configured to provide coverage to the NTN cell 520. As an example, the NTN node 502 and the NTN node 506 may be part of a satellite constellation that provides coverage to the NTN cell 520. The NTN node 502 and the NTN node 506 may be located at different elevations relative to one another. For example, the NTN node 502 may be in orbit a first distance (e.g., 550 km) above the surface of the Earth and the NTN node 506 may be in orbit a second distance (e.g., 1,000 km) above the surface of the Earth. The UE 530 may be configured to receive signals from both the NTN node 502 and the NTN node 506 in a network.

In some examples, an NTN deployment may provide different services based on the type of payload on-board the NTN node. The type of payload may determine whether the NTN node acts as a relay node or a base station. As an example, a transport payload may implement frequency conversion and an RF amplifier in both UL and DL directions and may correspond to an analog RF repeater. A transparent payload, as an example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Figure 6:
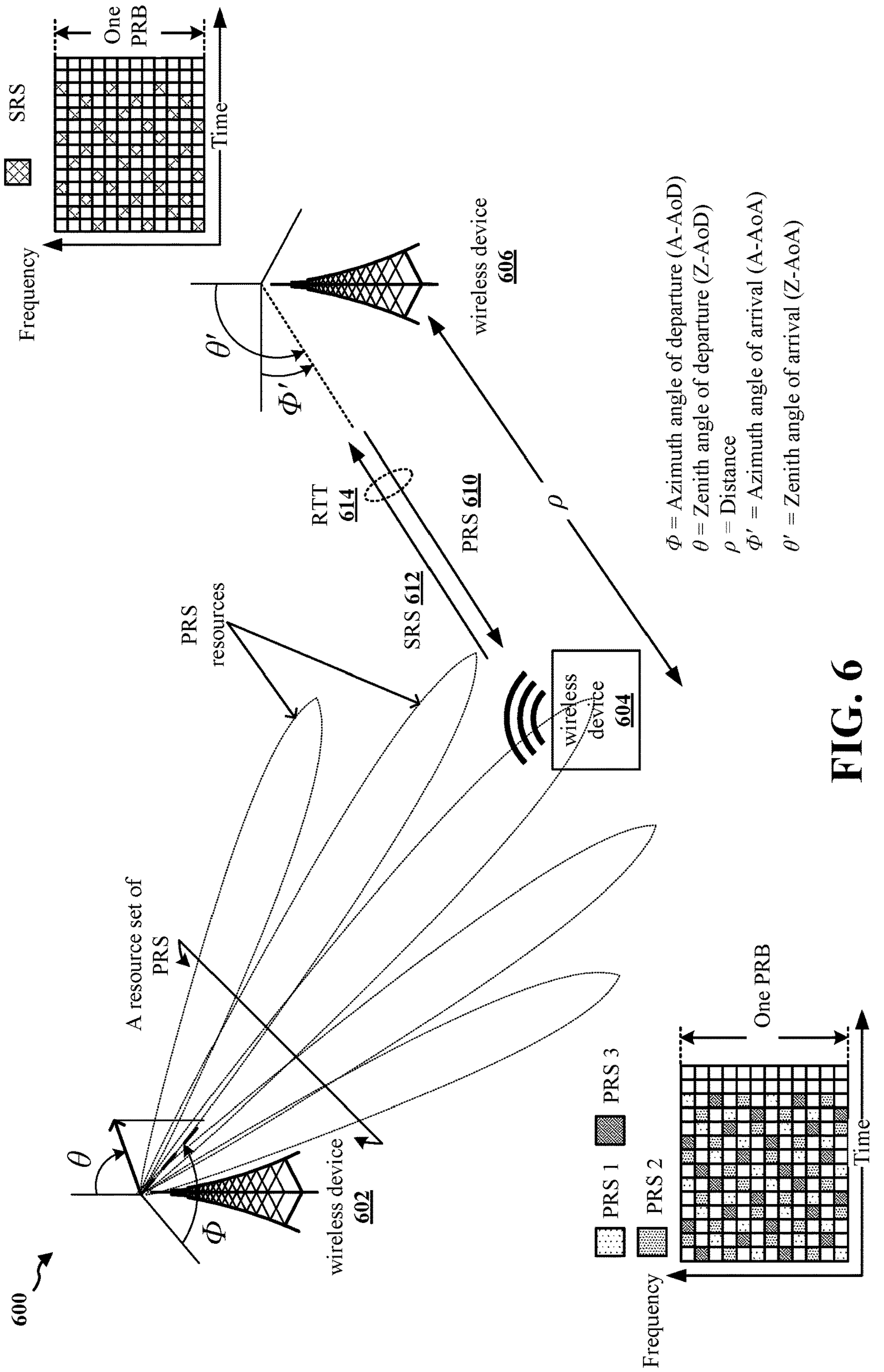
FIG. 6 is a diagram illustrating an example of a positioning based on positioning signal measurements.

FIG. 6 is a diagram 600 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 602 may be a base station, such as a TRP, an NTN node, or a UE with a known position/location, such as a positioning reference unit (PRU) or a UE with a high-accuracy sensor that may identify the location of the UE, for example a GNSS receiver. The wireless device 606 may be a base station or a UE with a known position/location. The wireless device 604 may be a UE or a TRP configured to perform positioning to calculate its position relative to the wireless device 602 and/or the wireless device 606. The wireless device 604 may transmit UL-SRS 612 at time $T_{SRS\_TX}$ and receive DL positioning reference signals (PRS) (DL-PRS) 610 at time $T_{PRS\_RX}$. The wireless device 606 may receive the UL-SRS 612 at time $T_{SRS\_RX}$ and transmit the DL-PRS 610 at time $T_{PRS\_TX}$. The wireless device 604 may receive the DL-PRS 610 before transmitting the UL-SRS 612, or may transmit the UL-SRS 612 before receiving the DL-PRS 610. In both cases, a positioning server (e.g., location server(s) 168, LMF 166) or the wireless device 604 may determine the RTT 614 based on $||T_{SRS\_RX}-T_{PRS\_TX}|-|T_{SRS\_TX}-T_{PRS\_RX}|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 602, 606 and measured by the wireless device 604, and the measured TRP Rx-Tx time difference measurements (i.e., $|T_{SRS\_RX}-T_{PRS\_TX}|$) and UL-SRS-RSRP at multiple wireless devices 602, 606 of uplink signals transmitted from wireless device 604. The wireless device 604 may measure the UE Rx-Tx time difference measurements (and optionally DL-PRS-RSRP of the received signals) using assistance data received from the positioning server, and the wireless devices 602, 606 may measure the gNB Rx-Tx time difference measurements (and optionally UL-SRS-RSRP of the received signals) using assistance data received from the positioning server. The measurements may be used at the positioning server or the wireless device 604 to determine the RTT. The RTT may be used to estimate the location of the wireless device 604. Other methods are possible for determining the RTT, such as for example using DL-TDOA and/or UL-TDOA measurements.

DL-AoD positioning may make use of the measured DL-PRS-RSRP of downlink signals received from multiple wireless devices 602, 606 at the wireless device 604. The wireless device 604 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 604 in relation to the neighboring wireless devices 602, 606.

DL-TDOA positioning may make use of the DL reference signal time difference (RSTD) (and optionally DL-PRS-RSRP) of downlink signals received from multiple wireless devices 602, 606 at the wireless device 604. The wireless device 604 may measure the DL RSTD (and optionally DL-PRS-RSRP) of the received signals using assistance data received from the positioning server, and the resulting measurements may be used along with other configuration information to locate a position/location the wireless device 604 in relation to the neighboring wireless devices 602, 606.

UL-TDOA positioning may make use of the UL relative time of arrival (RTOA) (and optionally UL-SRS-RSRP) at multiple wireless devices 602, 606 of uplink signals transmitted from wireless device 604. The wireless devices 602, 606 may measure the UL-RTOA (and optionally UL-SRS-RSRP) of the received signals using assistance data received from the positioning server, and the resulting measurements may be used along with other configuration information to estimate the location of the wireless device 604.

UL-AoA positioning may make use of the measured azimuth angle of arrival (A-AoA) and zenith angle of arrival (Z-AoA) at multiple wireless devices 602, 606 of uplink signals transmitted from the wireless device 604. The wireless devices 602, 606 may measure the A-AoA and the Z-AoA of the received signals using assistance data received from the positioning server, and the resulting measurements may be used along with other configuration information to estimate the location of the wireless device 604.

Additional positioning methods may be used for estimating the location of the wireless device 604, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

While the diagram 600 illustrates the wireless device 604 exchanging positioning signals with two wireless devices, the wireless device 602 and the wireless device 606, the wireless device 604 may perform positioning with more or less wireless devices to calculate its position relative to the other wireless devices. For example, the wireless device 604 may exchange positioning signals with a set of NTN nodes to calculate its position relative to the set of NTN nodes.

In some aspects, a wireless device, such as the wireless device 604, may perform positioning with an NTN node (e.g., a GNSS satellite, an LEO satellite) to calculate its position. For example, the wireless device may use precise point positioning (PPP) and/or real-time kinematic (RTK) techniques to calculate its position. In some aspects, the wireless device employing a PPP technique may use a single receiver and precise products to achieve decimeter accuracy, or even sub-decimeter accuracy, without base station dependency. However, the convergence time for PPP may be long, for example 20-60 minutes. In some aspects, the wireless device employing an RTK technique may provide cm-level positioning accuracy with a rapid convergence time (e.g., 5 seconds), however, RTK may be dependent on base stations and RTK may suffer when the network node is located far from the wireless device. In order to improve positioning. NTN nodes that are located closer to a wireless device may be used to calculate the position of the wireless device. For example, a GNSS satellite may be located 20,000 km above the surface of the Earth, while an LEO satellite may be located less than 2,000 km above the surface of the Earth (e.g., 800 km, 1,200 km). A LEO satellite may be any satellite in orbit (geostationary or non-geostationary) around the Earth having an elevation of less than 2,000 km. Network architecture for NTN nodes configured to communicate with terrestrial UEs may be configured in a variety of ways, for example the example aspects discussed relative to FIGS. 4A, 4B, 4C and 5.

A set of NTN nodes, such as LEO satellites, configured with a GNSS receiver, may act as a global RTK moving base station network. In other words, by configuring a set of NTN nodes with GNSS receivers, a system may integrate NTN nodes with both communication technologies and positioning, navigation, and timing (PNT) technologies. An NTN node with a GNSS receiver may receive GNSS payloads from GNSS satellites. Such payloads may be used to calculate the position of the NTN node that receives the GNSS payloads. In some aspects, an NTN node may receive a set of GNSS payloads from a set of GNSS satellites as a set of GNSS fix measurements, and then may transmit the set of GNSS fix measurements to a terrestrial UE. The GNSS fix measurements may be transmitted in an observation space representation (OSR) format. The terrestrial UE may then calculate the position of the NTN node based on the set of GNSS fix measurements transmitted by the NTN node and received by the terrestrial UE. The terrestrial UE may receive several such transmissions from a set of NTN nodes, allowing for the terrestrial UE to calculate the position of each of the set of NTN nodes, and then calculate its position relative to each of the set of NTN nodes based on positioning measurements. However, there may still be a great deal of latency when transmitting signals from NTN nodes to terrestrial UEs, and the latency from one NTN node to another NTN node may vary. For example, two NTN nodes in a set of NTN nodes may have varying elevations, such as 500 km above the surface of the Earth for one NTN node and 1,000 km above the surface of the Earth for another NTN node, which may result in different latencies for transmissions between a terrestrial UE and the two NTN nodes. For the terrestrial UE to accurately perform positioning with the NTN nodes, the terrestrial UE may be configured to calculate a first set of atmospheric delays associated with a first portion of the atmosphere (e.g., ionospheric delay) and a second set of atmospheric delays associated with a second portion of the atmosphere (e.g., tropospheric delay).

Figure 7:
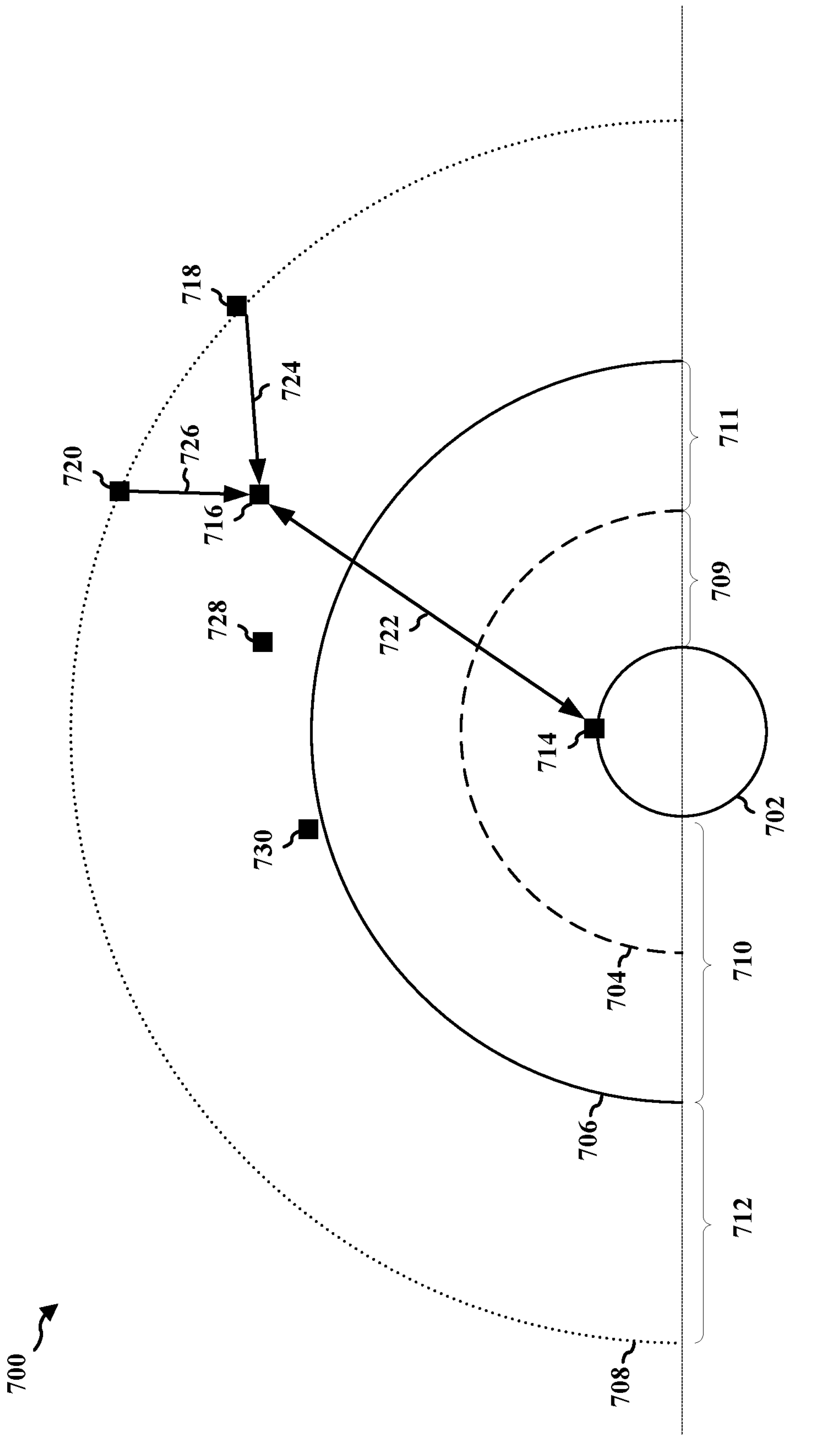
FIG. 7 illustrates an example of a UE performing positioning with a set of NTN nodes, in accordance with various aspects of the present disclosure.

FIG. 7 is a diagram 700 illustrating an example of a UE 714 configured to perform positioning with a set of NTN nodes, such as the NTN node 716, the NTN node 728, and the NTN node 730. The UE 714 may be a terrestrial UE on a planet 702, for example the planet Earth. The set of NTN nodes, such as the NTN node 716, the NTN node 728, and the NTN node 730, may include a set of LEO SV base stations. The set of LEO SV base stations may include base stations in orbit around the planet 702 that are within 2000 km from the surface of the planet 702. The set of NTN nodes may receive positioning signals from a set of GNSS devices, such as the GNSS signal 726 from the GNSS device 720 and the GNSS signal 724 from the GNSS device 718. The set of GNSS devices, such as the GNSS device 720 and the GNSS device 718, may include a set of GPS satellites configured with GNSS transmitters that transmit GNSS signals. The set of GNSS devices may include geosynchronous satellites that are more than 20,000 km above the surface of the planet 702. While the diagram 700 illustrates one UE on the planet 702, additional UEs may communicate with the set of NTN nodes. While the diagram 700 illustrates three NTN nodes configured to communicate with the UE 714, more or less NTN nodes may be configured to communicate with the UE 714 to assist the UE 714 in calculating its location on the planet 702. While the diagram 700 illustrates the NTN node 716 receiving GNSS signals from two GNSS devices, each of the set of NTN nodes may be configured to receive GNSS signals from any number of GNSS devices to aggregate a set of GNSS measurements, which may be saved, and transmitted, for example, in an OSR format.

The set of GNSS devices, such as the GNSS device 720 and the GNSS device 718, may have a set of geosynchronous orbital paths 708 about the planet 702 that allow the set of GNSS devices to have known, geosynchronous locations with respect to the surface of the planet 702. For example, the set of GNSS devices may include GPS satellites. The set of NTN nodes, such as the NTN node 716, the NTN node 728, and the NTN node 730, may have a set of orbital paths that may or may not be geosynchronous about the planet 702. The set of NTN nodes may be located different distances from the surface of the planet 702. For example, the NTN node 716 may be located a first distance (e.g., 1,000 km) from the surface of the planet 702 and the NTN node 730 may be located a second distance (e.g., 550 km) from the surface of the planet 702. The orbital path 706 about the planet 702 may represent a line of demarcation between a portion 712 of the atmosphere of the planet 702 and a portion 710 of the atmosphere of the planet 702. The portion 712 may represent the ionosphere of the atmosphere of the planet 702, and the portion 710 may represent the troposphere of the atmosphere of the planet 702. A sub-portion 711 of the portion 710, between the orbital path 704 and the orbital path 706, may represent a high density of electron particles, where wireless signals may encounter a highly ionized atmosphere that increase a delay of transmission more than other sub-portions of the portion 710 of the atmosphere. In other words, wireless signals traveling through the sub-portion 711 of the portion 710 may encounter more delay than wireless signals traveling through the portion 712 or through the sub-portion 709 of the portion 710 between the surface of the planet 702 and the orbital path 704. The sub-portion 711 may represent a band of atmosphere between 200 km and 400 km, where a higher concentration of ionized electron particles may be located.

If the UE 714 were to receive GNSS signals directly from the set of GNSS devices, such as the GNSS signal 726 from the GNSS device 720 or the GNSS signal 724 from the GNSS device 718, the UE 714 may have a slow convergence time to perform PPP positioning techniques due to uncorrected atmospheric effects when the signals travel through the sub-portion 711 with a large amount of ionized electron particles. The uncorrected atmospheric effect may cause the ranging residuals (e.g., calculated via a least-squares ambiguity decorrelation adjustment (LAMBDA) on measurements of the GNSS signals) to be larger than the one integer cycle region, which may specify more processing time to converge calculations using PPP positioning techniques. In other words, performing PPP on GNSS signals received by the UE 714 from the set of GNSS devices may result in a slow integer ambiguity resolution (IAR). However, since the electron density in the portion 712 of the atmosphere is low, performing PPP positioning techniques on GNSS signals received by the set of NTN nodes, such as the NTN node 716, the NTN node 728, and the NTN node 730, may have a fast IAR. For example, NTN nodes located more than 500 km from the surface of the planet 702 but below the set of geosynchronous orbital paths 708 of the set of GNSS devices may have a fast IAR when performing positioning using PPP techniques.

In some aspects, the UE 714 may be configured to perform PPP positioning techniques on GNSS signals. The set of NTN nodes may measure GNSS signals from the set of GNSS devices, may transmit the measurements to the UE 714, and the UE 714 may perform PPP positioning techniques on the measurements. For example, the NTN node 716 may receive the GNSS signal 726 from the GNSS device 720 and the GNSS signal 724 from the GNSS device 718. The NTN node 716 may measure the GNSS signals and construct a set of GNSS fix measurements. The measurements may include, for example, pseudorange measurements, carrier phase measurements, Doppler measurements, and/or carrier-to-noise density power ratio (CN0) measurements. The NTN node 716 may package the set of measurements in an observation space representation (OSR) format. The NTN node 716 may communicate with the UE 714 via the service link 722, allowing the UE 714 to receive the set of measurements in a DL signal from the NTN node 716. The UE 714 may, for example, receive an OSR file from the NTN node 716 that includes pseudorange measurements, carrier phase measurements, Doppler measurements, and CN0 measurements. The UE 714 may then perform PPP positioning techniques on the set of measurements to correct for positioning calculation errors. Such errors may include, for example, ranging errors, satellite vehicle (SV) clock errors, orbital path errors, code bias errors, and/or phase bias errors. Such calculations may result in a fast IAR since the NTN node 716 may receive the GNSS signal 726 and the GNSS signal 724 with minimal atmospheric delay, as the signals travel through the portion 712 of the atmosphere. In some aspects, the calculated ranging errors may not include any atmospheric impact, for example where the NTN node has an orbit within the portion 712 of the atmosphere (e.g., 700 km over the surface of the planet 702). In some aspects, the calculated ranging errors may include atmospheric impacts, for example where the NTN node has an orbit within the sub-portion 711 of the atmosphere (e.g., 300 km over the surface of the planet 702).

While the set of NTN nodes (e.g., NTN node 716) may receive GNSS signals with minimal atmospheric delays, terrestrial UEs (e.g., UE 714) receives transmissions from the set of NTN nodes with larger atmospheric delays. The UE 714 may also calculate a set of atmospheric delays associated with transmissions using via the service link 722 between the UE 714 and the NTN node 716 through the portion 710 of the atmosphere. The UE 714 may correct its RTK positioning based on the set of atmospheric delays for signals of the service link 722 that travel through the portion 712 of the atmosphere and through the portion 710 of the atmosphere. Such corrections may fill in a correction gap between the vertical long baseline between the UE 714 and the set of NTN nodes, such as the NTN node 716, the NTN node 728, and the NTN node 730.

In some aspects, the UE 714 may calculate the total electron content (TEC) in the portion 712 of the atmosphere between the NTN node 716 and the UE 714 with multi-frequency RF signals. For example, for a frequency $f_1$ and a frequency $f_2$ of UL and/or DL transmissions of the service link 722, the UE 714 may calculate the TEC by using the formula:

$$TEC_{P_{f1}-P_{f2}}(t)=\frac{1}{40.308}\left(\frac{f_1^2 f_2^2}{f_1^2-f_2^2}\right)(P_{f1}(t)-P_{f2}(t))$$

$$P_{f1}=\frac{RTT\cdot C}{2}$$

for a frequency $f_1$ bi-directional RF signal (e.g., an UL and DL signal for calculating RTT) or $P_{f1}$=TT·C for a frequency $f_1$ unidirectional RF signal (e.g., an UL or DL signal for calculating ToA). $P_{f1}$ may also be referred to as a range measurement, or a pseudorange measurement.

$$P_{f2}=\frac{RTT\cdot C}{2}$$

for a frequency $f_2$ bi-directional RF signal or $P_{f2}$=TT·C for a frequency $f_2$ unidirectional RF signal. $P_{f2}$ may also be referred to as a range measurement, or a pseudorange measurement.

Time t may be any time when the UE 714 is measuring a signal transmitted by the NTN node 716.

In some aspects, the UE 714 may calculate a delay rate for the portion 712 of the atmosphere. The delay rate may be referred to as an ionosphere delay rate. The UE 714 may calculate the delay rate based on the rate of TEC (ROT) (e.g., using a scaling factor) in the portion 712 of the atmosphere. The UE 714 may calculate the ROT based on consecutive epochs of TEC measurements from the same NTN node, e.g., the NTN node 716. In some aspects, the UE 714 may estimate the ROT based on consecutive epochs of TEC measurements from at least at least two NTN nodes within the same field of view (FOV) of the UE 714 (e.g., the NTN node 730 and the NTN node 728, where both the NTN node 730 and the NTN node 728 are in the same FOV). In some aspects, the UE 714 may first calculate the ROT based on consecutive epochs of TEC measurements from the same NTN node, e.g., the NTN node 716. If the ROT is greater or equal to a threshold (e.g., 0.1 TEC unit (TECU) per second), the UE 714 may then calculate the ROT based on consecutive epochs of TEC measurements from a plurality of NTN nodes (e.g., 2, 3, or 4 NTN nodes) within the same FOV, such as the NTN node 730 and the NTN node 728. The UE 714 may calculate the ROT by using the formula:

$$ROT(t_1)=\frac{TEC_{P_{f1}-P_{f2}}(t_1)-TEC_{P_{f1}-P_{f2}}(t_0)}{t_1-t_0}$$

Time $t_0$ may be a first time when the UE 714 is measuring a signal transmitted by the NTN node 716.

Time $t_1$ may be a second time when the UE 714 is measuring a signal transmitted by the NTN node 716.

In some aspects, the UE 714 may calculate a delay rate for the portion 710 of the atmosphere. The delay rate may be referred to as a troposphere delay rate. The UE 714 may calculate the delay rate based a ranging measurement residual plus the calculated TEC. The UE 714 may calculate the ROT by using the formula:

$$Tropo(t) = P_f - \frac{40.308}{f^2} TEC_{P_{f1}-P_{f2}}(t) - georange - clk$$

$$P_f = \frac{RTT \cdot C}{2}$$

for a frequency f bi-directional RF signal or $P_f$=TT·C for a frequency f unidirectional RF signal. $P_f$ may also be referred to as a range measurement, or a pseudorange measurement.

georange may be a calculated estimate of the distance between the UE 714 and the NTN node 716 based on a positioning measurement (e.g., ToA, RTT).

clk may be broadcast by the UE 714, or may be estimated by the UE 714.

When calculating the TEC, the delay rate for the portion 712 of the atmosphere, and/or the delay rate for the portion 710 of the atmosphere, the UE 714 may base the calculations on measurements of RSs from one or more NTN nodes. The RSs may include DL signals from the set of NTN nodes, for example DL signals including a payload of an OSR file with GNSS measurements. In some aspects, the UE 714 may select a subset of NTN nodes, and may perform calculations using signals with that selected subset for calculating the position of the UE 714. For example, the UE 714 may select a number of NTN nodes that have the highest elevations (e.g., the NTN node that has an elevation closest to 90°) or may weight a plurality of measurements based on the elevation of NTN nodes (e.g., higher weights on calculations based on transmissions with higher elevation NTN nodes and lower weights on calculations based on transmissions with lower elevation NTN nodes). In some aspects, the UE 714 may average weighted calculations (e.g., ROT, TEC, pseudorange estimates) based on the elevation divided by 90 degrees. For example, a calculation of an ROT based on measurements of transmissions with an NTN node at 80 degrees relative to the UE 714 may be weighted by $$\frac{80}{90}$$

and a calculation of an ROT based on measurements of transmissions with an NTN node at 60 degrees relative to the UE 714 may be weighted by $$\frac{60}{90}.$$

An NTN node having a 90-degree elevation may be an NTN node that is located directly overhead the UE 714.

In some aspects, the UE 714 may use data from a set of NTN nodes that have a calculated delay rate for the portion 712 of the atmosphere that is relatively homogeneous. The UE 714 may compare the calculated delay rate for the portion 712 of the atmosphere between different NTN nodes (e.g., the calculated ROT based on signals received from the NTN node 716 and the calculated ROT based on signals received from the NTN node 728) and ensure that the difference between the calculated ROT is less than or equal to a threshold value. If a set of NTN nodes have calculated delay rates for the portion 712 of the atmosphere that is greater than or equal to the threshold value, the UE 714 may select a subset of the NTN nodes to ensure that the difference between the calculated delay rates are less than or equal to the threshold value.

When the UE 714 performs positioning using RTK techniques, the UE 714 may perform corrections on the calculated location based on the calculated TEC, the delay rate for the portion 712 of the atmosphere, and/or the delay rate for the portion 710 of the atmosphere. The UE 714 may calculate the elevation of each of the set of NTN nodes, for example based on ephemeris data or based on orbital navigation data from the set of NTN nodes. The UE 714 may calculate a delay through the portion 712 of the atmosphere from each of the set of NTN nodes to the UE 714 based on the calculated TEC and the elevation of the NTN node of the set of NTN nodes. For example, the UE may calculate the delay based on the formula:

$$Iono^{PRNi}(t) = SF1(elev^{PRNi}) \cdot TEC_{P_{f1}-P_{f2}}(t)$$

The $elev^{PRNi}$ may include the calculated elevation of the NTN node i.

The SF1( ) may include a vertical to slant factor (SF) for ionospheric delay.

The UE 714 may calculate a delay from each of the set of NTN nodes to the UE 714 based on the calculated TEC and the elevation of the NTN node of the set of NTN nodes. For example, the UE may calculate the delay based on the formula:

$$Tropo^{PRNi}(t) = SF2(elev^{PRNi}) \cdot Tropo(t)$$

The SF2( ) may include a SF for tropospheric delay.

In some aspects, an SF, such as SF1 or SF2 above, may be a mapping function based primarily on a satellite elevation.

The UE 714 may correct the calculation of the location of the UE 714 using RTK based on the calculated delay rate for the portion 712 of the atmosphere for each of the set of NTN nodes (e.g., $Iono^{PRN1}$(t) for a first NTN node, $Iono^{PRN2}$(t) for a second NTN node) and based on the calculated delay rate for the portion 710 of the atmosphere for each of the set of NTN nodes (e.g., $Tropo^{PRN1}$(t) PRN for a first NTN node, $Tropo^{PRN2}$(t) for a second NTN node). For example, by calculating phase and code observables on a frequency band based on a PPP-RTK technique. Each of the set of NTN nodes may be treated as a pivot satellite for a set of rover satellites having GNSS transmitter payloads.

Figure 8:
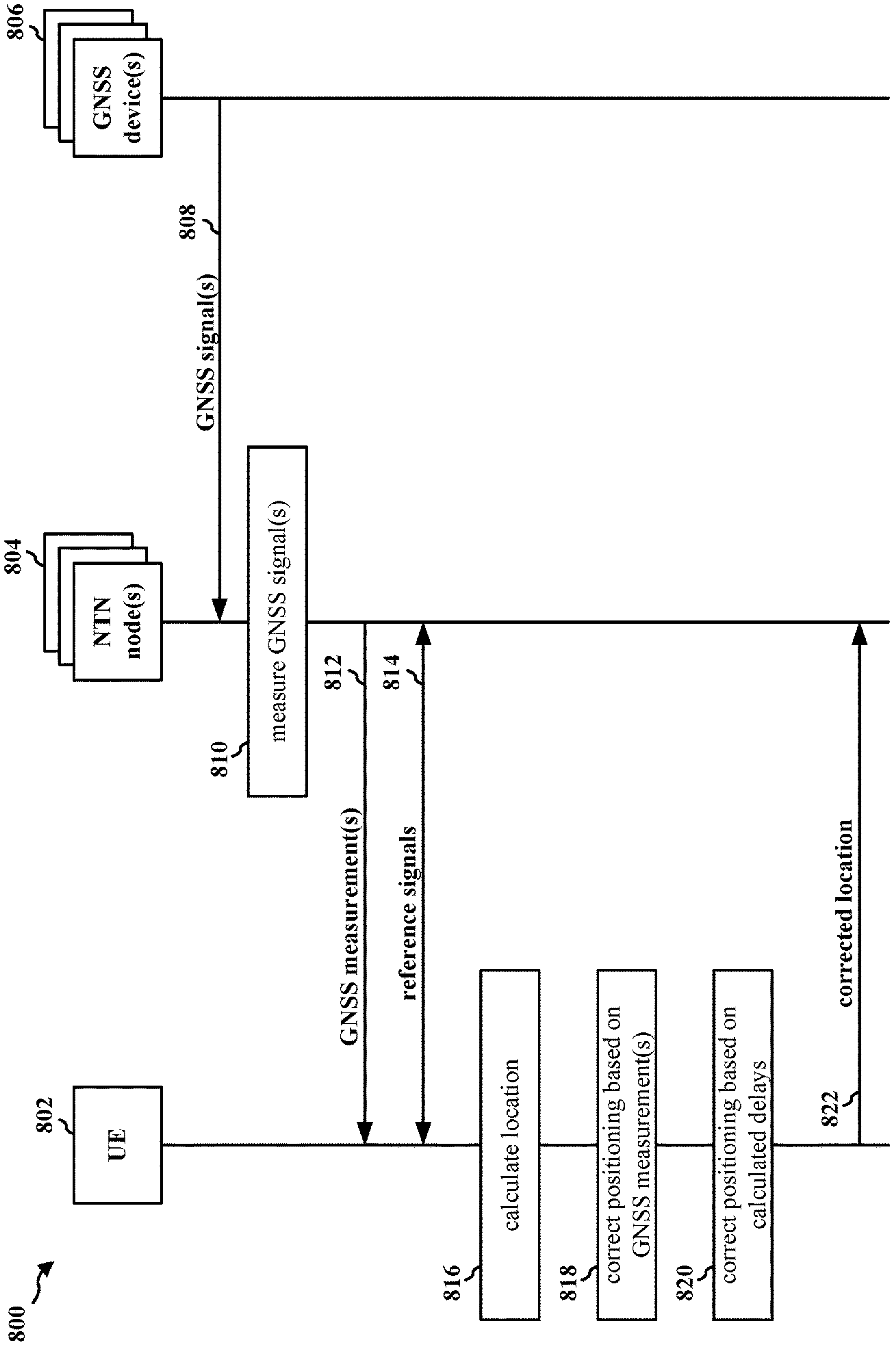
FIG. 8 is a connection flow diagram of a UE performing positioning with a set of NTN nodes, in accordance with various aspects of the present disclosure.

FIG. 8 is a connection flow diagram 800 of a UE 802 performing positioning with a set of NTN nodes 804, in accordance with various aspects of the present disclosure. The set of NTN nodes 804 may include a set of LEO SV base stations configured to communicate with the UE 802. The set of NTN nodes 804 may include satellites that are in orbit around the Earth having an elevation of less than 2,000 km. The set of NTN nodes 804 may include a set of GNSS receivers configured to receive GNSS signals from the set of GNSS devices 806. The set of GNSS devices 806 may include geostationary satellites with a set of GNSS transmitters configured to transmit GNSS signals. The set of GNSS devices 806 may include, for example, GPS satellites stationed in geostationary orbit about the Earth. The UE 802 may include a terrestrial UE that is configured to communicate with the set of NTN nodes 804 via a wireless protocol, such as 5G NR.

The set of GNSS devices 806 may transmit a set of GNSS signals 808. The set of GNSS devices 806 may be configured to transmit the set of GNSS signals 808 periodically, for example once every five seconds. The set of NTN nodes 804 may receive the set of GNSS signals 808 from the set of GNSS devices 806. In some aspects, a subset of the set of NTN nodes 804 may receive the same subset of the set of GNSS signals 808 from the same subset of the set of GNSS devices 806. In some aspects, a subset of the set of NTN nodes 804 may receive different subsets of the set of GNSS signals 808 from different subsets of the set of GNSS devices 806. In other words, at least two of the set of NTN nodes 804 may receive the same GNSS signals from a same subset of the set of GNSS devices 806, and/or at least two of the set of NTN nodes 804 may not receive the same GNSS signals from the same subset of the set of GNSS devices 806 as the coverage areas may not be identical.

At 810, the set of NTN nodes 804 may measure the set of GNSS signals 808 received from the set of GNSS devices 806. The set of NTN nodes 804 may save the measured GNSS signals as a set of GNSS fix measurements. The set of NTN nodes 804 may transmit the set of GNSS fix measurements 812 to the UE 802. The set of GNSS fix measurements 812 may be transmitted in an OSR format. The set of GNSS fix measurements may include, for example, a set of pseudorange measurements, a set of carrier phase measurements, a set of Doppler measurements, and/or a set of CN0 measurements based on the set of GNSS signals 808.

The UE 802 may receive the set of GNSS fix measurements 812 from the set of NTN nodes 804. Each of the set of NTN nodes 804 may transmit a discrete set of GNSS fix measurements 812 to the UE 802 based on GNSS signals received by the NTN node. The UE 802 may receive the set of GNSS fix measurements 812 as a DL transmission from each of the set of NTN nodes 804. In some aspects, the UE 802 may receive the set of GNSS measurements as a payload of a set of RSs 814 which may be received from the set of NTN nodes 804. The UE 802 may exchange the set of RSs 814 as a set of positioning signals with the set of NTN nodes 804, allowing the UE 802 to perform positioning, such as PPP positioning and/or RTK positioning, based on the set of RSs 814 between the UE 802 and the set of NTN nodes 804. The set of RSs 814 may include a set of unidirectional positioning signals, for example a set of PRSs transmitted by the set of NTN nodes 804. The set of RSs 814 may include a set of bidirectional positioning signals, for example a set of PRSs transmitted by the set of NTN nodes 804 in response to a set of SRSs transmitted by the UE 802, or a set of SRSs transmitted by the UE 802 in response to receiving a set of PRSs transmitted by the set of NTN nodes 804. The set of RSs 814 may include positioning signals with a payload of a set of GNSS measurements, allowing a positioning signal to act as both a communication signal to deliver a payload of GNSS measurements (e.g., in OSR format) to the UE 802 and as a positioning signal that may be measured to perform positioning (e.g., PPP positioning, RTK positioning). The set of RSs 814 may include a plurality of frequencies, allowing the UE 802 to calculate measurements based on a first frequency or a second frequency at a time t.

At 816, the UE 802 may calculate its location based on at least one of the set of GNSS fix measurements 812 and the set of RSs 814. For example, the UE 802 may calculate a location of each of the set of NTN nodes 804 based on the set of GNSS fix measurements 812. In another example, the UE 802 may perform RTK based on measurements of the set of RSs 814. In another example, the UE 802 may calculate its location based on measurements of the set of RSs 814, and may decode at least some of the set of RSs to identify a set of GNSS fix measurements corresponding with the set of NTN nodes 804, so as to calculate the location of each of the set of NTN nodes 804 based on the set of GNSS fix measurements.

At 818, the UE 802 may correct the calculated location based on the set of GNSS fix measurements 812. For example, the UE 802 may correct (a) a ranging error, (b) an SV clock error, (c) an orbital path error, (d) a code bias error, and/or (e) a phase bias error.

At 820, the UE 802 may correct the calculated location based on a first set of atmospheric delays (e.g., an ionospheric delay) and based on a second set of atmospheric delays (e.g., a tropospheric delay). The UE 802 may calculate the first set of atmospheric delays and the second set of atmospheric delays based on the set of RSs 814 from the set of NTN nodes. In some aspects, the UE 802 may calculate the first set of atmospheric delays and the second set of atmospheric delays based on a subset of the set of RSs 814. The UE 802 may select a subset of the set of RSs 814 that correspond with a subset of the set of NTN nodes 804 based on a set of suitable or desired criteria, for example the NTN node with the highest elevation relative to the UE 802, or the top three NTN nodes with the highest elevation relative to the UE 802, or the three NTN nodes with a calculated ROT that diverge the least (have the smallest difference) from an average ROT value. In some aspects, the UE 802 may weight measurements of the set of RSs 814, or may weight calculations (e.g., TEC, ROT) based on the measurements of the set of RSs 814, based on an elevation angle of the NTN node associated with the set of RSs 814. For example, the UE 802 may weight a calculated ROT associated with RSs received from an NTN node having an 80° elevation by $$\frac{80}{90}$$

and may weight a calculated ROT associated with RSs received from an NTN node having an 75° elevation by $$\frac{75}{90}.$$

The UE 802 may calculate a TEC between each of the set of NTN nodes 804 and the UE 802 based on measurements of multi-frequency RF signals of the set of RSs 814. For example, the UE 802 may calculate a TEC associated with a first time based on a first set of range measurements associated with a first RF of a plurality of RFs (e.g., $P_{f1}(t)$) and associated with a second set of range measurements associated with a second RF of a plurality of RFs (e.g., $P_{f2}(t)$). The UE 802 may calculate an ionospheric delay rate, or an ROT, based on the calculated TEC at two different times. The UE 802 may calculate a tropospheric delay rate based on the calculated TEC. In some aspects, if the calculated ionospheric delay rate, or the calculated ROT, associated with the set of NTN nodes 804 diverges by at least a threshold amount from one another (e.g., the difference between the maximum and minimum ROT is greater than or equal to a threshold amount), the UE 802 may select a subset of the calculated ionospheric delay rates, or the calculated ROTs, associated with a subset of the set of NTN nodes 804, until the divergence is less than or equal to the threshold amount. The UE 802 may calculate an ionosphere delay for each of the set of NTN nodes 804 to the UE 802 based on the calculated TEC and an elevation of each of the set of NTN nodes (e.g., $lono^{PRNi}(t)$). The UE 802 may calculate a troposphere delay for each of the set of NTN nodes 804 to the UE 802 based on the calculated tropospheric delay rate and an elevation of each of the set of NTN nodes (e.g., $Tropo^{PRNi}(t)$). The UE 802 may correct the calculated location of the UE 802 based on the calculated ionosphere delay and the calculated troposphere delay for each of the set of NTN nodes 804 used to calculate the UE's location at 816.

The UE 802 may transmit the corrected location 822 to a base station, for example one of the set of NTN nodes 804. In other aspects, the UE 802 may transmit the corrected location 822 to a terrestrial base station.

Figure 9:
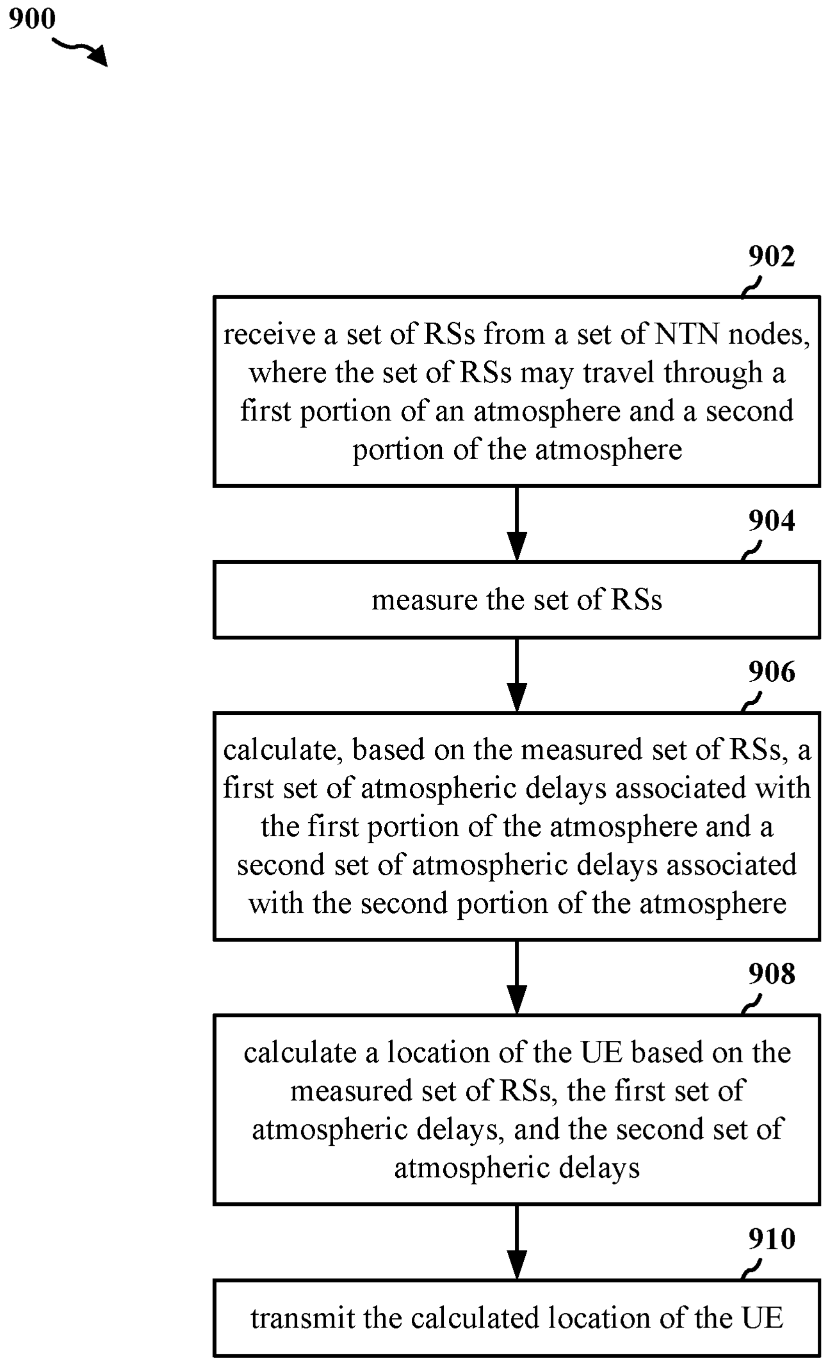
FIG. 9 is a flowchart of a method of wireless communication.

FIG. 9 is a flowchart 900 of a method of wireless communication. The method may be performed by a UE (e.g., the UE 104, the UE 350, the UE 405, the UE 530, the UE 535, the UE 714, the UE 802; the wireless device 604; the apparatus 1304). At 902, the UE may receive a set of RSs from a set of NTN nodes. The set of RSs may travel through a first portion of an atmosphere and a second portion of the atmosphere. For example, 902 may be performed by the UE 802 in FIG. 8, which may receive the set of RSs 814 from the set of NTN nodes 804. The set of RSs may travel through a first portion of an atmosphere and a second portion of the atmosphere. Moreover, 902 may be performed by the component 198 in FIG. 1, 3, or 13.

At 904, the UE may measure the set of RSs. For example, 904 may be performed by the UE 802 in FIG. 8, which may, at 816, measure the set of RSs 814 to perform positioning. Moreover, 904 may be performed by the component 198 in FIG. 1, 3, or 13.

At 906, the UE may calculate, based on the measured set of RSs, a first set of atmospheric delays associated with the first portion of the atmosphere and a second set of atmospheric delays associated with the second portion of the atmosphere. For example, 906 may be performed by the UE 802 in FIG. 8, which may, at 820, calculate, based on the measured set of RSs, a first set of atmospheric delays associated with the first portion of the atmosphere (e.g., an ionosphere) and a second set of atmospheric delays associated with the second portion of the atmosphere (e.g., a troposphere). Moreover, 906 may be performed by the component 198 in FIG. 1. 3, or 13.

At 908, the UE may calculate a location of the UE based on the measured set of RSs, the first set of atmospheric delays, and the second set of atmospheric delays. For example, 908 may be performed by the UE 802 in FIG. 8, which may calculate a location of the UE 802 based on the measured set of RSs, the first set of atmospheric delays, and the second set of atmospheric delays. Moreover, 908 may be performed by the component 198 in FIG. 1, 3, or 13.

At 910, the UE may transmit the calculated location of the UE. For example, 910 may be performed by the UE 802 in FIG. 8, which may transmit the corrected location 822 of the UE 802. Moreover, 910 may be performed by the component 198 in FIG. 1. 3, or 13.

Figure 10:
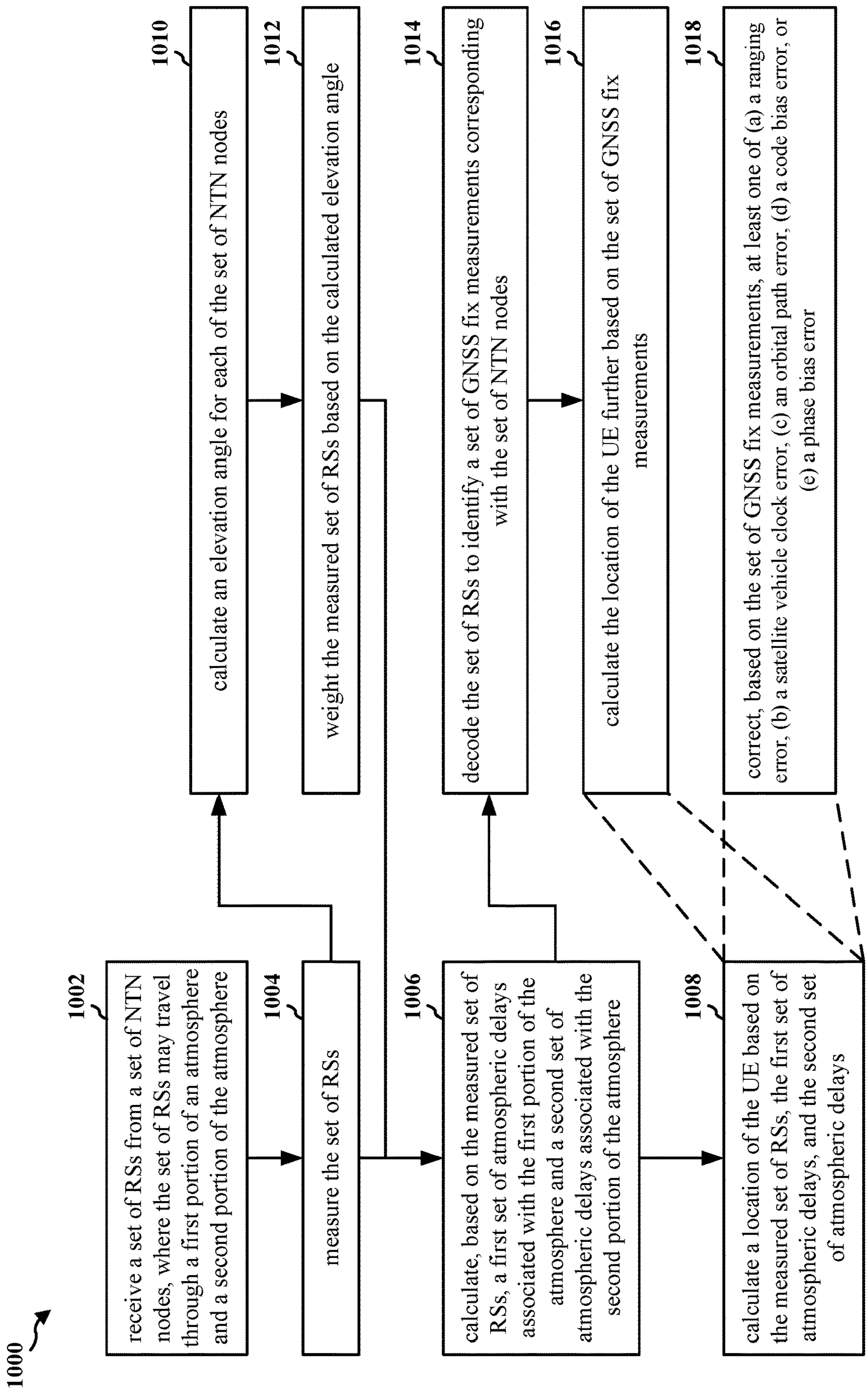
FIG. 10 is a flowchart of a method of wireless communication.

FIG. 10 is a flowchart 1000 of a method of wireless communication. The method may be performed by a UE (e.g., the UE 104, the UE 350, the UE 405, the UE 530, the UE 535, the UE 714, the UE 802; the wireless device 604; the apparatus 1304). At 1002, the UE may receive a set of RSs from a set of NTN nodes. The set of RSs may travel through a first portion of an atmosphere and a second portion of the atmosphere. For example, 1002 may be performed by the UE 802 in FIG. 8, which may receive the set of RSs 814 from the set of NTN nodes 804. The set of RSs may travel through a first portion of an atmosphere and a second portion of the atmosphere. Moreover, 1002 may be performed by the component 198 in FIG. 1, 3, or 13.

At 1004, the UE may measure the set of RSs. For example, 1004 may be performed by the UE 802 in FIG. 8, which may, at 816, measure the set of RSs 814 to perform positioning. Moreover, 1004 may be performed by the component 198 in FIG. 1, 3, or 13.

At 1006, the UE may calculate, based on the measured set of RSs, a first set of atmospheric delays associated with the first portion of the atmosphere and a second set of atmospheric delays associated with the second portion of the atmosphere. For example, 1006 may be performed by the UE 802 in FIG. 8, which may, at 820, calculate, based on the measured set of RSs, a first set of atmospheric delays associated with the first portion of the atmosphere (e.g., an ionosphere) and a second set of atmospheric delays associated with the second portion of the atmosphere (e.g., a troposphere). Moreover, 1006 may be performed by the component 198 in FIG. 1. 3, or 13.

At 1008, the UE may calculate a location of the UE based on the measured set of RSs, the first set of atmospheric delays, and the second set of atmospheric delays. For example, 1008 may be performed by the UE 802 in FIG. 8, which may, at 816, calculate a location of the UE 802 based on the measurements of the set of RSs 814 (or set of GNSS fix measurements 812), the first set of atmospheric delays, and the second set of atmospheric delays. Moreover, 1008 may be performed by the component 198 in FIG. 1, 3, or 13.

At 1010, the UE may calculate an elevation angle for each of the set of NTN nodes. For example, 1010 may be performed by the UE 802 in FIG. 8, which may, at 820, calculate an elevation angle for each of the set of NTN nodes 804. Moreover, 1010 may be performed by the component 198 in FIG. 1, 3, or 13.

At 1012, the UE may weight the measured set of RSs based on the calculated elevation angle. For example, 1012 may be performed by the UE 802 in FIG. 8, which may, at 820, weight the measurements of the set of RSs 814 based on the calculated elevation angle. Moreover, 1012 may be performed by the component 198 in FIG. 1, 3, or 13.

At 1014, the UE may decode the set of RSs to identify a set of GNSS fix measurements corresponding with the set of NTN nodes. For example, 1014 may be performed by the UE 802 in FIG. 8, which may decode the set of RSs 814 to identify the set of GNSS fix measurements used at 818 corresponding with the set of NTN nodes 804. Moreover, 1014 may be performed by the component 198 in FIG. 1, 3, or 13.

At 1016, the UE may calculate the location of the UE by calculating the location of the UE further based on the set of GNSS fix measurements. For example, 1016 may be performed by the UE 802 in FIG. 8, which may, at 818, calculate the location of the UE further based on the set of GNSS fix measurements. Moreover, 1016 may be performed by the component 198 in FIG. 1, 3, or 13.

At 1018, the UE may calculate the location of the UE by correcting, based on the set of GNSS fix measurements, at least one of (a) a ranging error, (b) a satellite vehicle clock error, (c) an orbital path error, (d) a code bias error, or (e) a phase bias error. For example, 1018 may be performed by the UE 802 in FIG. 8, which may, at 818, correct, based on the set of GNSS fix measurements, at least one of (a) a ranging error, (b) a satellite vehicle clock error, (c) an orbital path error, (d) a code bias error, or (e) a phase bias error. Moreover, 1018 may be performed by the component 198 in FIG. 1,3, or 13.

Figure 11:
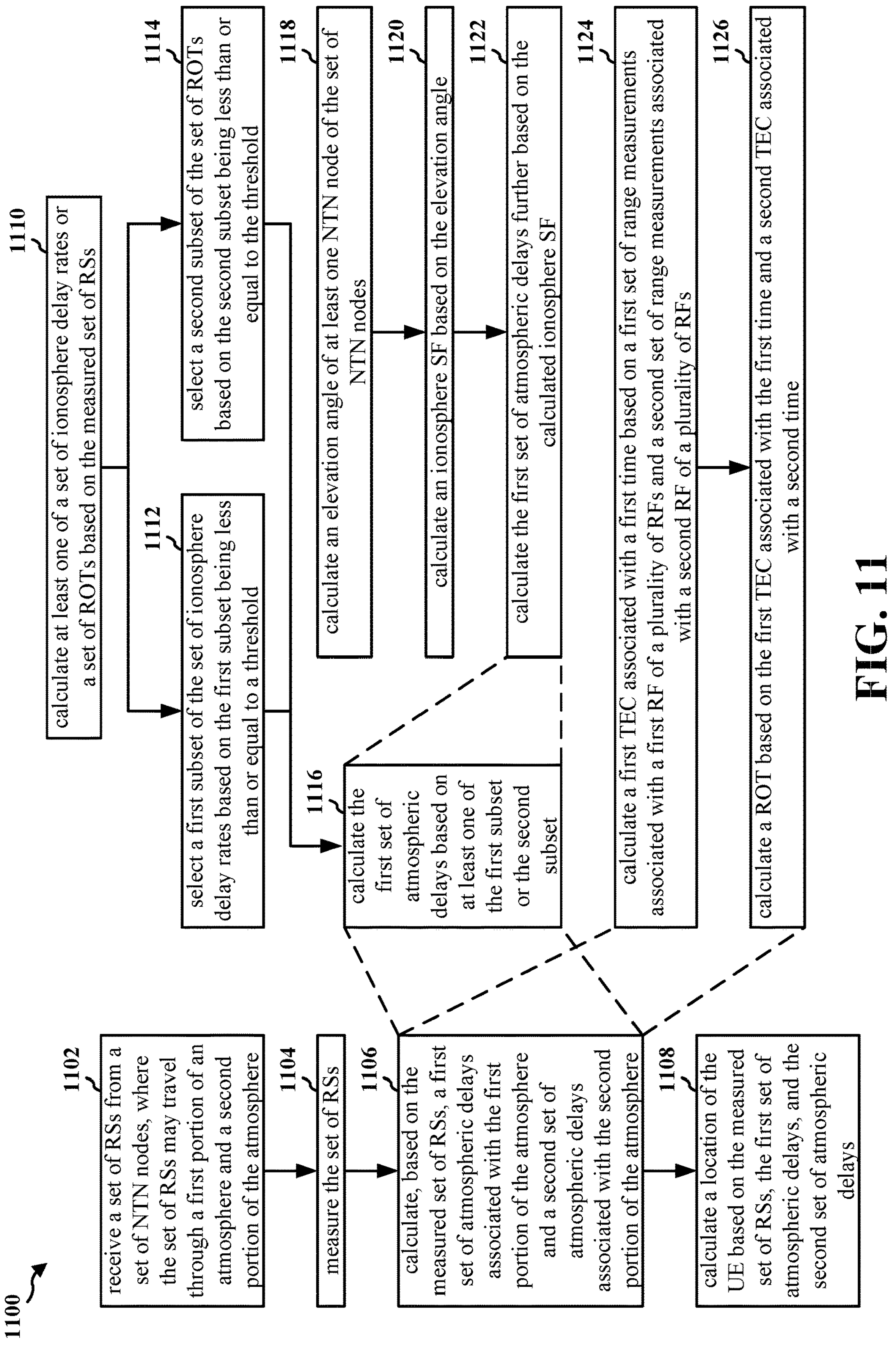
FIG. 11 is a flowchart of a method of wireless communication.

FIG. 11 is a flowchart 1100 of a method of wireless communication. The method may be performed by a UE (e.g., the UE 104, the UE 350, the UE 405, the UE 530, the UE 535, the UE 714, the UE 802; the wireless device 604; the apparatus 1304). At 1102, the UE may receive a set of RSs from a set of NTN nodes. The set of RSs may travel through a first portion of an atmosphere and a second portion of the atmosphere. For example, 1102 may be performed by the UE 802 in FIG. 8, which may receive the set of RSs 814 from the set of NTN nodes 804. The set of RSs may travel through a first portion of an atmosphere (e.g., an ionosphere) and a second portion of the atmosphere (e.g., a troposphere). Moreover, 1102 may be performed by the component 198 in FIG. 1, 3, or 13.

At 1104, the UE may measure the set of RSs. For example, 1104 may be performed by the UE 802 in FIG. 8, which may, at 816, measure the set of RSs 814 to perform positioning at 816. Moreover, 1104 may be performed by the component 198 in FIG. 1,3, or 13.

At 1106, the UE may calculate, based on the measured set of RSs, a first set of atmospheric delays associated with the first portion of the atmosphere and a second set of atmospheric delays associated with the second portion of the atmosphere. For example, 1106 may be performed by the UE 802 in FIG. 8, which may, at 820, calculate, based on the measured set of RSs, a first set of atmospheric delays associated with the first portion of the atmosphere (e.g., an ionosphere) and a second set of atmospheric delays associated with the second portion of the atmosphere (e.g., a troposphere). Moreover, 1106 may be performed by the component 198 in FIG. 1, 3, or 13.

At 1108, the UE may calculate a location of the UE based on the measured set of RSs, the first set of atmospheric delays, and the second set of atmospheric delays. For example, 1108 may be performed by the UE 802 in FIG. 8, which may, at 816, 818, and/or 820, calculate a location of the UE 802 based on the measured set of RSs, the first set of atmospheric delays, and the second set of atmospheric delays. Moreover, 1108 may be performed by the component 198 in FIG. 1, 3, or 13.

At 1110, the UE may calculate at least one of a set of ionosphere delay rates or a set of ROTs based on the measured set of RSs. For example, 1110 may be performed by the UE 802 in FIG. 8, which may, at 820, calculate at least one of a set of ionosphere delay rates or a set of ROTs based on the measurements of the set of RSs 814. Moreover, 1110 may be performed by the component 198 in FIG. 1, 3, or 13.

At 1112, the UE may select a first subset of the set of ionosphere delay rates based on the first subset being less than or equal to a threshold. For example, 1112 may be performed by the UE 802 in FIG. 8, which may, at 820, select a first subset of the set of ionosphere delay rates based on the first subset being less than or equal to a threshold (e.g., 0.1 TECU/s). Moreover, 1112 may be performed by the component 198 in FIG. 1, 3, or 13.

At 1114, the UE may select a second subset of the set of ROTs based on the second subset being less than or equal to the threshold. For example, 1114 may be performed by the UE 802 in FIG. 8, which may, at 820, select a second subset of the set of ROTs based on the second subset being less than or equal to the threshold. Moreover, 1114 may be performed by the component 198 in FIG. 1, 3, or 13.

At 1116, the UE may calculate, based on the measured set of RSs, the first set of atmospheric delays associated with the first portion of the atmosphere by calculating the first set of atmospheric delays based on at least one of the first subset or the second subset. For example, 1116 may be performed by the UE 802 in FIG. 8, which may calculate, at 820, the first set of atmospheric delays based on at least one of the first subset or the second subset. Moreover, 1116 may be performed by the component 198 in FIG. 1, 3, or 13.

At 1118, the UE may calculate an elevation angle of at least one NTN node of the set of NTN nodes. For example, 1118 may be performed by the UE 802 in FIG. 8, which may, at 820, calculate an elevation angle of at least one NTN node of the set of NTN nodes. Moreover, 1118 may be performed by the component 198 in FIG. 1, 3, or 13.

At 1120, the UE may calculate an ionosphere SF based on the elevation angle. For example, 1120 may be performed by the UE 802 in FIG. 8, which may calculate an ionosphere SF based on the elevation angle. Moreover, 1120 may be performed by the component 198 in FIG. 1, 3, or 13.

At 1122, the UE may calculate the first set of atmospheric delays by calculating the first set of atmospheric delays further based on the calculated ionosphere SF. For example, 1122 may be performed by the UE 802 in FIG. 8, which may, at 820, calculate the first set of atmospheric delays further based on the calculated ionosphere SF. Moreover, 1122 may be performed by the component 198 in FIG. 1, 3, or 13.

At 1124, the UE may calculate the first set of atmospheric delays associated with the first portion of the atmosphere and the second set of atmospheric delays associated with the second portion of the atmosphere by calculating a first TEC associated with a first time based on a first set of range measurements associated with a first RF of a plurality of RFs and a second set of range measurements associated with a second RF of a plurality of RFs. For example, 1124 may be performed by the UE 802 in FIG. 8, which may, at 820, calculate a first TEC associated with a first time based on a first set of range measurements associated with a first RF of a plurality of RFs and a second set of range measurements associated with a second RF of a plurality of RFs. Moreover, 1124 may be performed by the component 198 in FIG. 1, 3, or 13.

At 1126, the UE may calculate the first set of atmospheric delays associated with the first portion of the atmosphere by calculating a ROT based on the first TEC associated with the first time and a second TEC associated with a second time. For example, 1126 may be performed by the UE 802 in FIG. 8, which may, at 820, calculate a ROT based on the first TEC associated with the first time and a second TEC associated with a second time. Moreover, 1126 may be performed by the component 198 in FIG. 1,3, or 13.

Figure 12:
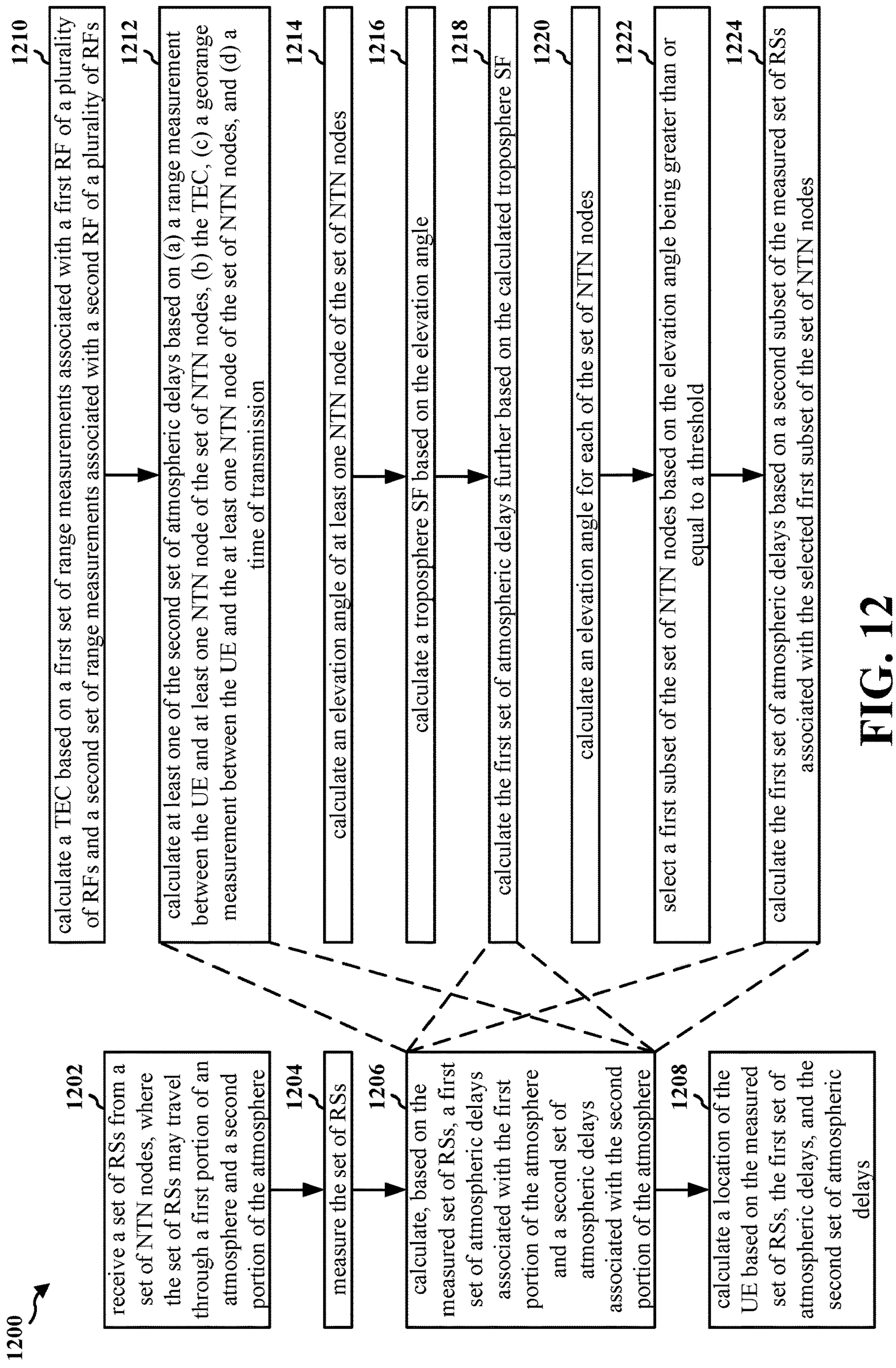
FIG. 12 is a flowchart of a method of wireless communication.

FIG. 12 is a flowchart 1200 of a method of wireless communication. The method may be performed by a UE (e.g., the UE 104, the UE 350, the UE 405, the UE 530, the UE 535, the UE 714, the UE 802; the wireless device 604; the apparatus 1304). At 1202, the UE may receive a set of RSs from a set of NTN nodes. The set of RSs may travel through a first portion of an atmosphere and a second portion of the atmosphere. For example, 1202 may be performed by the UE 802 in FIG. 8, which may receive the set of RSs 814 from the set of NTN nodes 804. The set of RSs may travel through a first portion of an atmosphere and a second portion of the atmosphere. Moreover, 1202 may be performed by the component 198 in FIG. 1, 3, or 13.

At 1204, the UE may measure the set of RSs. For example, 1204 may be performed by the UE 802 in FIG. 8, which may, at 816, measure the set of RSs 814 to perform positioning. Moreover, 1204 may be performed by the component 198 in FIG. 1, 3, or 13.

At 1206, the UE may calculate, based on the measured set of RSs, a first set of atmospheric delays associated with the first portion of the atmosphere and a second set of atmospheric delays associated with the second portion of the atmosphere. For example, 1206 may be performed by the UE 802 in FIG. 8, which may, at 820, calculate, based on the measured set of RSs, a first set of atmospheric delays associated with the first portion of the atmosphere (e.g., an ionosphere) and a second set of atmospheric delays associated with the second portion of the atmosphere (e.g., a troposphere). Moreover, 1206 may be performed by the component 198 in FIG. 1, 3, or 13.

At 1208, the UE may calculate a location of the UE based on the measured set of RSs, the first set of atmospheric delays, and the second set of atmospheric delays. For example, 1208 may be performed by the UE 802 in FIG. 8, which may, at 816, 818, and/or 820, calculate a location of the UE 802 based on the measured set of RSs, the first set of atmospheric delays, and the second set of atmospheric delays. Moreover, 1208 may be performed by the component 198 in FIG. 1, 3, or 13.

At 1210, the UE may calculate a TEC based on a first set of range measurements associated with a first RF of a plurality of RFs and a second set of range measurements associated with a second RF of a plurality of RFs. For example, 1210 may be performed by the UE 802 in FIG. 8, which may, at 820, calculate a TEC based on a first set of range measurements associated with a first RF of a plurality of RFs of the set of RSs 814 and a second set of range measurements associated with a second RF of a plurality of RFs of the set of RSs 814. Moreover, 1210 may be performed by the component 198 in FIG. 1, 3, or 13.

At 1212, the UE may calculate the second set of atmospheric delays associated with the second portion of the atmosphere by calculating at least one of the second set of atmospheric delays based on (a) a range measurement between the UE and at least one NTN node of the set of NTN nodes, (b) the TEC, (c) a georange measurement between the UE and the at least one NTN node of the set of NTN nodes, and (d) a time of transmission. For example, 1212 may be performed by the UE 802 in FIG. 8, which may, at 820, calculate at least one of the second set of atmospheric delays based on (a) a range measurement between the UE 802 and at least one NTN node of the set of NTN nodes 804, (b) the TEC, (c) a georange measurement between the UE 802 and the at least one NTN node of the set of NTN nodes 804, and (d) a time of transmission. Moreover, 1212 may be performed by the component 198 in FIG. 1, 3, or 13.

At 1214, the UE may calculate an elevation angle of at least one NTN node of the set of NTN nodes. For example, 1214 may be performed by the UE 802 in FIG. 8, which may, at 820, calculate an elevation angle of at least one NTN node of the set of NTN nodes 804. Moreover, 1214 may be performed by the component 198 in FIG. 1, 3, or 13.

At 1216, the UE may calculate a troposphere SF based on the elevation angle. For example, 1216 may be performed by the UE 802 in FIG. 8, which may, 820, calculate a troposphere SF based on the elevation angle. Moreover, 1216 may be performed by the component 198 in FIG. 1, 3, or 13.

At 1218, the UE may calculate the first set of atmospheric delays associated with the first portion of the atmosphere based on the calculated troposphere SF. For example, 1218 may be performed by the UE 802 in FIG. 8, which may, at 820, calculate the first set of atmospheric delays further based on the calculated troposphere SF. Moreover, 1218 may be performed by the component 198 in FIG. 1, 3, or 13.

At 1220, the UE may calculate an elevation angle for each of the set of NTN nodes. For example, 1220 may be performed by the UE 802 in FIG. 8, which may, at 820, calculate an elevation angle for each of the set of NTN nodes. Moreover, 1220 may be performed by the component 198 in FIG. 1, 3, or 13.

At 1222, the UE may select a first subset of the set of NTN nodes based on the elevation angle being greater than or equal to a threshold. For example, 1222 may be performed by the UE 802 in FIG. 8, which may select a first subset of the set of NTN nodes 804 based on the elevation angle being greater than or equal to a threshold (e.g., greater than 75 degrees). Moreover, 1222 may be performed by the component 198 in FIG. 1, 3, or 13.

At 1224, the UE may calculate the first set of atmospheric delays associated with the first portion of the atmosphere by calculating the first set of atmospheric delays based on a second subset of the measured set of RSs associated with the selected first subset of the set of NTN nodes. For example, 1224 may be performed by the UE 802 in FIG. 8, which may, at 820, calculate the first set of atmospheric delays based on a second subset of the measurements of the set of RSs 814 associated with the selected first subset of the set of NTN nodes 804. Moreover, 1224 may be performed by the component 198 in FIG. 1, 3, or 13.

Figure 13:
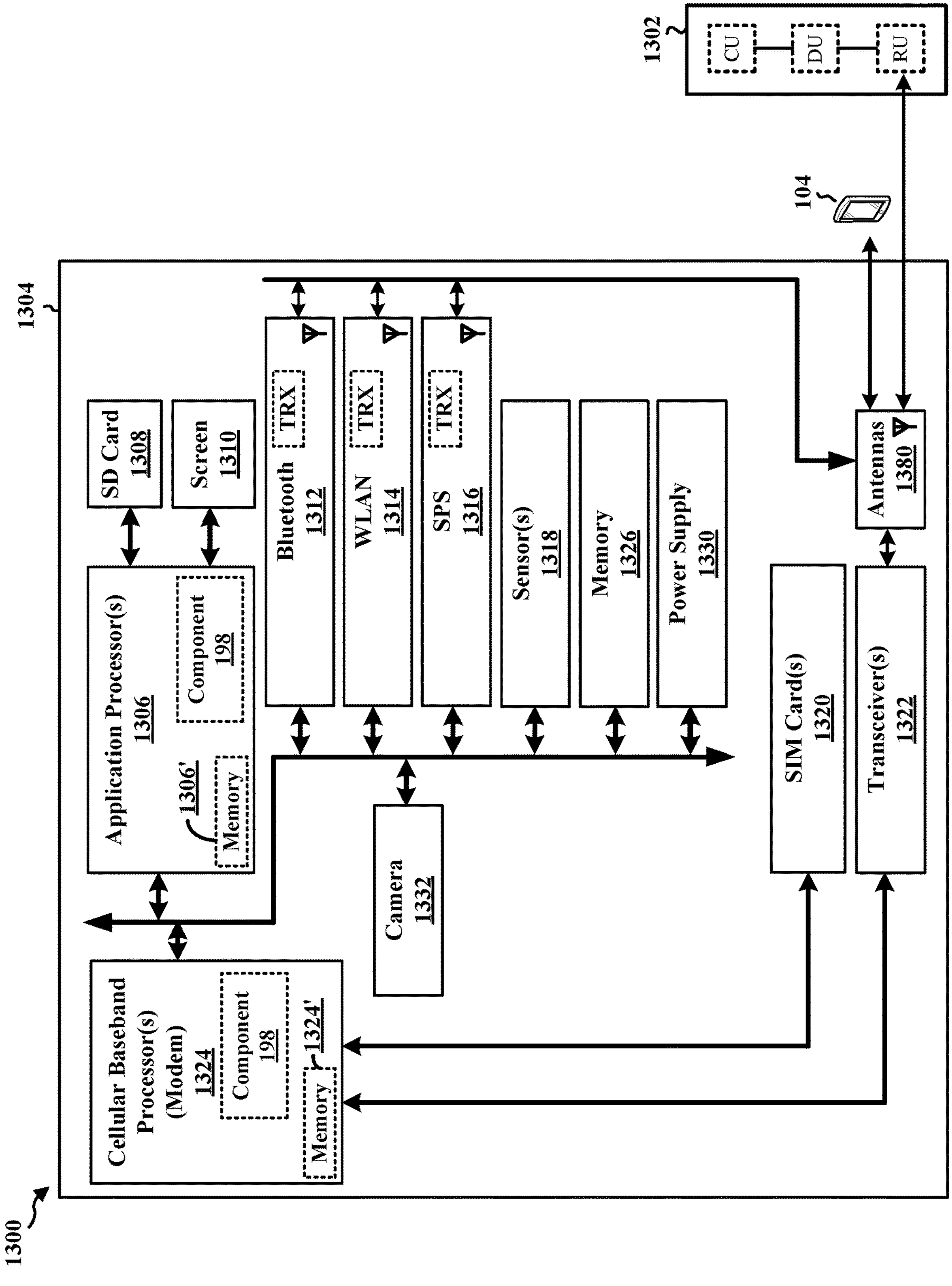
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1404 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to receive a set of RSs from a set of NTN nodes. The set of RSs may travel from the set of NTN nodes to the apparatus through a first portion of an atmosphere (e.g., an ionosphere) and through a second portion of the atmosphere (e.g., a troposphere). The component 198 may be configured to measure the set of RSs. The component 198 may be configured to calculate, based on the measured set of RSs, a first set of atmospheric delays associated with the first portion of the atmosphere and a second set of atmospheric delays associated with the second portion of the atmosphere. The component 198 may be configured to calculate a location of the apparatus 1304 based on the measured set of RSs, the first set of atmospheric delays, and the second set of atmospheric delays. The component 198 may be configured to transmit the calculated location of the apparatus 1304. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for receiving a set of RSs from a set of NTN nodes. The set of RSs may travel through a first portion of an atmosphere and a second portion of the atmosphere. The apparatus 1304 may include means for measuring the set of RSs. The apparatus 1304 may include means for calculating, based on the measured set of RSs, a first set of atmospheric delays associated with the first portion of the atmosphere and a second set of atmospheric delays associated with the second portion of the atmosphere. The apparatus 1304 may include means for calculating a location of the UE based on the measured set of RSs, the first set of atmospheric delays, and the second set of atmospheric delays. The apparatus 1304 may include means for transmitting the calculated location of the UE. The set of NTN nodes may include a set of LEO SV base stations. The set of NTN nodes may include a set of GNSS receivers. The set of RSs may include a set of GNSS fix measurements based on the set of GNSS receivers. The apparatus 1304 may include means for decoding the set of RSs to identify the set of GNSS fix measurements corresponding with the set of NTN nodes. The apparatus 1304 may include means for calculating the location of the UE by calculating the location of the UE further based on the set of GNSS fix measurements. The set of GNSS fix measurements may include a set of measurements in an OSR format. The set of measurements may include at least one of (a) a set of pseudorange measurements, (b) a set of carrier phase measurements, (c) a set of Doppler measurements, or (d) a set of CN0 measurements. The apparatus 1304 may include means for calculating the location of the UE further based on the set of GNSS fix measurements by correcting, based on the set of GNSS fix measurements, at least one of (a) a ranging error, (b) an SV clock error, (c) an orbital path error, (d) a code bias error, or (c) a phase bias error. The first set of atmospheric delays may include an ionosphere delay. The set of RSs may include at least one RS including a plurality of RFs. The apparatus 1304 may include means for calculating the first set of atmospheric delays based on the measured set of RSs by calculating a first TEC associated with a first time based on a first set of range measurements associated with a first RF of the plurality of RFs and a second set of range measurements associated with a second RF of the plurality of RFs. The apparatus 1304 may include means for calculating the first set of atmospheric delays based on the measured set of RSs by calculating a ROT based on the first TEC associated with the first time and a second TEC associated with a second time. The apparatus 1304 may include means for calculating at least one of a set of ionosphere delay rates or a set of ROTs based on the measured set of RSs. The apparatus 1304 may include means for selecting a first subset of the set of ionosphere delay rates based on the first subset being less than or equal to a threshold or selecting a second subset of the set of ROTs based on the second subset being less than or equal to the threshold. The apparatus 1304 may include means for calculating the first set of atmospheric delays by calculating the first set of atmospheric delays based on at least one of the first subset or the second subset. The apparatus 1304 may include means for calculating the first set of atmospheric delays based on at least one of the first subset or the second subset by calculating an elevation angle of at least one NTN node of the set of NTN nodes, by calculating an ionosphere SF based on the elevation angle, and by calculating the first set of atmospheric delays further based on the calculated ionosphere SF. The second set of atmospheric delays may include a troposphere delay. The set of RSs may include at least one RS including a plurality of RFs. The apparatus 1304 may include means for calculating the second set of atmospheric delays based on the measured set of RSs by calculating a TEC based on a first set of range measurements associated with a first RF of the plurality of RFs and a second set of range measurements associated with a second RF of the plurality of RFs. The apparatus 1304 may include means for calculating the second set of atmospheric delays based on the measured set of RSs by calculating at least one of the second set of atmospheric delays based on a range measurement between the UE and at least one NTN node of the set of NTN nodes, the TEC, a georange measurement between the UE and the at least one NTN node of the set of NTN nodes, and a time of transmission. The apparatus 1304 may include means for calculating the second set of atmospheric delays based on the measured set of RSs by calculating an elevation angle of at least one NTN node of the set of NTN nodes, by calculating a troposphere SF based on the elevation angle, and by calculating the first set of atmospheric delays further based on the calculated troposphere SF. The apparatus 1304 may include means for calculating an elevation angle for each of the set of NTN nodes. The apparatus 1304 may include means for selecting a first subset of the set of NTN nodes based on the elevation angle being greater than or equal to a threshold. The apparatus 1304 may include means for calculating the first set of atmospheric delays based on the measured set of RSs by calculating the first set of atmospheric delays based on a second subset of the measured set of RSs associated with the selected first subset of the set of NTN nodes. The apparatus 1304 may include means for calculating an elevation angle for each of the set of NTN nodes. The apparatus 1304 may include means for weighting the measured set of RSs based on the calculated elevation angle. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as an "example" or "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, may send the data to a component of the device that transmits the data, or may send the data to a component of the device. A device configured to "obtain" data, such as a transmission, signal, or message, may receive, for example with a transceiver, may obtain the data from a component of the device that receives the data, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a set of reference signals (RSs) from a set of non-terrestrial network (NTN) nodes, wherein the set of RSs travel through a first portion of an atmosphere and a second portion of the atmosphere; measuring the set of RSs; calculating, based on the measured set of RSs, a first set of atmospheric delays associated with the first portion of the atmosphere and a second set of atmospheric delays associated with the second portion of the atmosphere; and calculating a location of the UE based on the measured set of RSs, the first set of atmospheric delays, and the second set of atmospheric delays.

Aspect 2 is the method of aspect 1, further comprising transmitting the calculated location of the UE.

Aspect 3 is the method of either of aspects 1 or 2, wherein the set of NTN nodes comprises a set of low-earth orbit (LEO) satellite vehicle (SV) base stations.

Aspect 4 is the method of any of aspects 1 to 3, wherein the set of NTN nodes comprises a set of global navigation satellite system (GNSS) receivers, wherein the set of RSs comprises a set of GNSS fix measurements based on the set of GNSS receivers, the method further comprising: decoding the set of RSs to identify the set of GNSS fix measurements corresponding with the set of NTN nodes, wherein calculating the location of the UE comprises calculating the location of the UE further based on the set of GNSS fix measurements.

Aspect 5 is the method of aspect 4, wherein the set of GNSS fix measurements comprises a set of measurements in an observation space representation (OSR) format.

Aspect 6 is the method of aspect 5, wherein the set of measurements comprises at least one of: a set of pseudorange measurements; a set of carrier phase measurements; a set of Doppler measurements; or a set of carrier-to-noise density power ratio (CN0) measurements.

Aspect 7 is the method of any of aspects 4 to 6, wherein calculating the location of the UE further based on the set of GNSS fix measurements comprises: correcting, based on the set of GNSS fix measurements, at least one of: a ranging error; a satellite vehicle (SV) clock error; an orbital path error; a code bias error; or a phase bias error.

Aspect 8 is the method of any of aspects 1 to 7, wherein the first set of atmospheric delays comprises an ionosphere delay.

Aspect 9 is the method of any of aspects 1 to 8, wherein the set of RSs comprises at least one RS including a plurality of radio frequencies (RFs), wherein calculating the first set of atmospheric delays based on the measured set of RSs comprises calculating a first total electron content (TEC) associated with a first time based on a first set of range measurements associated with a first RF of the plurality of RFs and a second set of range measurements associated with a second RF of the plurality of RFs.

Aspect 10 is the method of aspect 9, wherein calculating the first set of atmospheric delays based on the measured set of RSs further comprises calculating a rate of TEC (ROT) based on the first TEC associated with the first time and a second TEC associated with a second time.

Aspect 11 is the method of any of aspects 1 to 10, further comprising: calculating at least one of a set of ionosphere delay rates or a set of rates of total electron content (ROTs) based on the measured set of RSs; and selecting a first subset of the set of ionosphere delay rates based on the first subset being less than or equal to a threshold or selecting a second subset of the set of ROTs based on the second subset being less than or equal to the threshold, wherein calculating the first set of atmospheric delays comprises calculating the first set of atmospheric delays based on at least one of the first subset or the second subset.

Aspect 12 is the method of aspect 11, wherein calculating the first set of atmospheric delays based on at least one of the first subset or the second subset comprises: calculating an elevation angle of at least one NTN node of the set of NTN nodes; calculating an ionosphere slant factor (SF) based on the elevation angle; and calculating the first set of atmospheric delays further based on the calculated ionosphere SF.

Aspect 13 is the method of any of aspects 1 to 12, wherein the second set of atmospheric delays comprises a troposphere delay.

Aspect 14 is the method of any of aspects 1 to 13, wherein the set of RSs comprises at least one RS including a plurality of radio frequencies (RFs), wherein calculating the second set of atmospheric delays based on the measured set of RSs comprises calculating a total electron content (TEC) based on a first set of range measurements associated with a first RF of the plurality of RFs and a second set of range measurements associated with a second RF of the plurality of RFs.

Aspect 15 is the method of aspect 14, wherein calculating the second set of atmospheric delays based on the measured set of RSs further comprises calculating at least one of the second set of atmospheric delays based on a range measurement between the UE and at least one NTN node of the set of NTN nodes, the TEC, a georange measurement between the UE and the at least one NTN node of the set of NTN nodes, and a time of transmission.

Aspect 16 is the method of any of aspects 1 to 15, wherein calculating the second set of atmospheric delays based on the measured set of RSs comprises: calculating an elevation angle of at least one NTN node of the set of NTN nodes; calculating a troposphere slant factor (SF) based on the elevation angle; and calculating the first set of atmospheric delays further based on the calculated troposphere SF.

Aspect 17 is the method of any of aspects 1 to 16, further comprising: calculating an elevation angle for each of the set of NTN nodes; and selecting a first subset of the set of NTN nodes based on the elevation angle being greater than or equal to a threshold, wherein calculating the first set of atmospheric delays based on the measured set of RSs comprises calculating the first set of atmospheric delays based on a second subset of the measured set of RSs associated with the selected first subset of the set of NTN nodes.

Aspect 18 is the method of any of aspects 1 to 17, further comprising: calculating an elevation angle for each of the set of NTN nodes; and weighting the measured set of RSs based on the calculated elevation angle.

Aspect 19 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 18.

Aspect 20 is an apparatus for wireless communication, comprising means for performing each step in the method of any of aspects 1 to 18.

Aspect 21 is the apparatus of any of aspects 1 to 18, further comprising a transceiver configured to receive or to transmit in association with the method of any of aspects 1 to 18.

Aspect 22 is a computer-readable medium (e.g., a non-transitory computer-readable medium) storing computer executable code, the code when executed by at least one processor causes the at least one processor, individually or in any combination, to perform the method of any of aspects 1 to 18.

What is claimed is:

1. An apparatus for wireless communication at a user equipment (UE), comprising:

at least one non-transitory memory; and at least one processor coupled to the at least one non-transitory memory and, based at least in part on information stored in the at least one non-transitory memory, the at least one processor is configured to:

receive a set of reference signals (RSs) from a set of non-terrestrial network (NTN) nodes, wherein the set of RSs travel through a first portion of an atmosphere and a second portion of the atmosphere;

measure the set of RSs;

calculate at least one of a set of ionosphere delay rates or a set of rates of total electron content (ROTs) based on the measured set of RSs;

select a first subset of the calculated set of ionosphere delay rates based on the first subset being less than or equal to a threshold or select a second subset of the calculated set of ROTs based on the second subset being less than or equal to the threshold;

calculate, using at least one of the selected first subset of the calculated set of ionosphere delay rates or the selected second subset of the calculated set of ROTs, a first set of atmospheric delays associated with the first portion of the atmosphere and a second set of atmospheric delays associated with the second portion of the atmosphere; and calculate a location of the UE based on the measured set of RSs associated with at least one of the selected first subset of the calculated set of ionosphere delay rates or the selected second subset of the calculated set of ROTs, the calculated first set of atmospheric delays, and the calculated second set of atmospheric delays.

2. The apparatus of claim 1, wherein the at least one processor is further configured to:

transmit the calculated location of the UE.

3. The apparatus of claim 1, wherein the set of NTN nodes comprises a set of low-earth orbit (LEO) satellite vehicle (SV) base stations.

4. The apparatus of claim 1, wherein the set of NTN nodes comprises a set of global navigation satellite system (GNSS) receivers, wherein the set of RSs comprises a set of GNSS fix measurements based on the set of GNSS receivers, wherein the at least one processor is further configured to:

decode the set of RSs to identify the set of GNSS fix measurements corresponding with the set of NTN nodes, wherein, to calculate the location of the UE, the at least one processor is configured to:

calculate the location of the UE further based on the set of GNSS fix measurements.

5. The apparatus of claim 4, wherein the set of GNSS fix measurements comprises an observation space representation (OSR).

6. The apparatus of claim 4, wherein the set of measurements comprises at least one of:

a set of pseudorange measurements;

a set of carrier phase measurements;

a set of Doppler measurements;

a set of carrier-to-noise density power ratio (CNO) measurements; or any combination thereof.

7. The apparatus of claim 4, wherein, to calculate the location of the UE further based on the set of GNSS fix measurements, the at least one processor is configured to:

correct, based on the set of GNSS fix measurements, at least one of:

a ranging error;

a satellite vehicle (SV) clock error;

an orbital path error;

a code bias error;

a phase bias error; or any combination thereof.

8. The apparatus of claim 1, wherein the first set of atmospheric delays comprises an ionosphere delay.

9. The apparatus of claim 1, wherein the set of RSs comprises at least one RS including a plurality of radio frequencies (RFs), wherein, to calculate, based on at least one of the selected first subset of the set of ionosphere delay rates or the selected second subset of the set of ROTs, the first set of atmospheric delays associated with the first portion of the atmosphere, the at least one processor is configured to:

calculate a first total electron content (TEC) associated with a first time based on a first set of range measurements associated with a first RF of the plurality of RFs.

10. The apparatus of claim 9, wherein, to calculate, based on at least one of the selected first subset of the set of ionosphere delay rates or the selected second subset of the set of ROTs, the first set of atmospheric delays associated with the first portion of the atmosphere, the at least one processor is further configured to:

calculate a rate of TEC (ROT) based on the first TEC associated with the first time and a second TEC associated with a second time based on a second set of range measurements associated with a second RF of the plurality of RFs.

11. The apparatus of claim 1, wherein, to calculate, based on at least one of the selected first subset of the set of ionosphere delay rates or the selected second subset of the set of ROTs, the first set of atmospheric delays associated with the first portion of the atmosphere is configured to:

calculate an elevation angle of at least one NTN node of the set of NTN nodes;

calculate an ionosphere slant factor (SF) based on the elevation angle; and calculate the first set of atmospheric delays further based on the calculated ionosphere SF.

12. The apparatus of claim 1, wherein the second set of atmospheric delays comprises a troposphere delay.

13. The apparatus of claim 1, wherein the set of RSs comprises at least one RS including a plurality of radio frequencies (RFs), wherein, to calculate, based on at least one of the selected first subset of the set of ionosphere delay rates or the selected second subset of the set of ROTs, the second set of atmospheric delays associated with the second portion of the atmosphere, the at least one processor is configured to:

calculate a total electron content (TEC) based on a first set of range measurements associated with a first RF of the plurality of RFs and a second set of range measurements associated with a second RF of the plurality of RFs.

14. The apparatus of claim 13, wherein, to calculate, based on at least one of the selected first subset of the set of ionosphere delay rates or the selected second subset of the set of ROTs, the second set of atmospheric delays associated with the second portion of the atmosphere, the at least one processor is further configured to:

calculate at least one of the second set of atmospheric delays based on a range measurement between the UE and at least one NTN node of the set of NTN nodes, the TEC, a georange measurement between the UE and the at least one NTN node of the set of NTN nodes, and a time of transmission.

15. The apparatus of claim 1, wherein, to calculate, based on at least one of the selected first subset of the set of ionosphere delay rates or the selected second subset of the set of ROTs, the second set of atmospheric delays associated with the second portion of the atmosphere, the at least one processor is configured to:

calculate an elevation angle of at least one NTN node of the set of NTN nodes;

calculate a troposphere slant factor (SF) based on the elevation angle; and calculate the first set of atmospheric delays further based on the calculated troposphere SF.

16. The apparatus of claim 1, wherein the at least one processor is further configured to:

calculate an elevation angle for each of the set of NTN nodes; and select a third subset of the set of NTN nodes based on the elevation angle being greater than or equal to a second threshold, wherein, to calculate, based on at least one of the selected first subset of the set of ionosphere delay rates or the selected second subset of the set of ROTs, the first set of atmospheric delays associated with the first portion of the atmosphere, the at least one processor is configured to:

calculate the first set of atmospheric delays further based on a determination that a fourth subset of the measured set of RSs are associated with the selected third subset of the set of NTN nodes.

17. The apparatus of claim 1, wherein the at least one processor is further configured to:

calculate an elevation angle for each of the set of NTN nodes; and weight the measured set of RSs based on the calculated elevation angle.

18. The apparatus of claim 1, further comprising a transceiver coupled to the at least one processor, wherein the at least one processor is further configured to:

receive, via the transceiver, the set of RSs from the set of NTN nodes.

19. The apparatus of claim 1, wherein, to calculate the location of the UE based on the measured set of RSs associated with at least one of the selected first subset of the calculated set of ionosphere delay rates or the selected second subset of the calculated set of ROTs, the calculated first set of atmospheric delays, and the calculated second set of atmospheric delays, the at least one processor is configured to:

correct a set of real-time kinematic (RTK) positioning based on the calculated first set of atmospheric delays and the calculated second set of atmospheric delays.

20. The apparatus of claim 1, wherein the at least one non-transitory memory comprises a non-transitory hardware memory.

21. A method of wireless communication at a user equipment (UE), comprising:

receiving a set of reference signals (RSs) from a set of non-terrestrial network (NTN) nodes, wherein the set of RSs travel through a first portion of an atmosphere and a second portion of the atmosphere;

measuring the set of RSs;

calculating at least one of a set of ionosphere delay rates or a set of rates of total electron content (ROTs) based on the measured set of RSs;

selecting a first subset of the calculated set of ionosphere delay rates based on the first subset being less than or equal to a threshold or selecting a second subset of the calculated set of ROTs based on the second subset being less than or equal to the threshold;

calculating, using at least one of the selected first subset of the calculated set of ionosphere delay rates or the selected second subset of the calculated set of ROTs, a first set of atmospheric delays associated with the first portion of the atmosphere and a second set of atmospheric delays associated with the second portion of the atmosphere; and calculating a location of the UE based on the measured set of RSs associated with at least one of the selected first subset of the calculated set of ionosphere delay rates or the selected second subset of the calculated set of ROTs, the calculated first set of atmospheric delays, and the calculated second set of atmospheric delays.

22. The method of claim 21, wherein the set of NTN nodes comprises a set of global navigation satellite system (GNSS) receivers, wherein the set of RSs comprises a set of GNSS fix measurements based on the set of GNSS receivers, the method further comprising:

decoding the set of RSs to determine the set of GNSS fix measurements corresponding with the set of NTN nodes, wherein calculating the location of the UE comprises:

calculating the location of the UE further based on the set of GNSS fix measurements.

23. The method of claim 21, wherein the set of RSs comprises at least one RS including a plurality of radio frequencies (RFs), wherein calculating, based on at least one of the selected first subset of the set of ionosphere delay rates or the selected second subset of the set of ROTs, the first set of atmospheric delays associated with the first portion of the atmosphere comprises:

calculating a first total electron content (TEC) associated with a first time based on a first set of range measurements associated with a first RF of the plurality of RFs.

24. The method of claim 23, wherein calculating, based on at least one of the selected first subset of the set of ionosphere delay rates or the selected second subset of the set of ROTs, the first set of atmospheric delays associated with the first portion of the atmosphere further comprises:

calculating a rate of TEC (ROT) based on the first TEC associated with the first time and a second TEC associated with a second time based on a second set of range measurements associated with a second RF of the plurality of RFs.

25. The method of claim 21, wherein calculating, based on at least one of the selected first subset of the set of ionosphere delay rates or the selected second subset of the set of ROTs, the first set of atmospheric delays associated with the first portion of the atmosphere comprises:

calculating an elevation angle of at least one NTN node of the set of NTN nodes;

calculating an ionosphere slant factor (SF) based on the elevation angle; and calculating the first set of atmospheric delays further based on the calculated ionosphere SF.

26. The method of claim 21, wherein the set of RSs comprises at least one RS including a plurality of radio frequencies (RFs), wherein calculating, based on at least one of the selected first subset of the set of ionosphere delay rates or the selected second subset of the set of ROTs, the second set of atmospheric delays associated with the second portion of the atmosphere comprises:

calculating a total electron content (TEC) based on a first set of range measurements associated with a first RF of the plurality of RFs and a second set of range measurements associated with a second RF of the plurality of RFs.

27. The method of claim 26, wherein calculating, based on at least one of the selected first subset of the set of ionosphere delay rates or the selected second subset of the set of ROTs, the second set of atmospheric delays associated with the second portion of the atmosphere further comprises:

calculating at least one of the second set of atmospheric delays based on a range measurement between the UE and at least one NTN node of the set of NTN nodes, the TEC, a georange measurement between the UE and the at least one NTN node of the set of NTN nodes, and a time of transmission.

28. The method of claim 21, wherein calculating, based on at least one of the selected first subset of the set of ionosphere delay rates or the selected second subset of the set of ROTs, the second set of atmospheric delays associated with the second portion of the atmosphere comprises:

calculating an elevation angle of at least one NTN node of the set of NTN nodes;

calculating a troposphere slant factor (SF) based on the elevation angle; and calculating the first set of atmospheric delays further based on the calculated troposphere SF.

29. An apparatus for wireless communication at a user equipment (UE), comprising:

means for receiving a set of reference signals (RSs) from a set of non-terrestrial network (NTN) nodes, wherein the set of RSs travel through a first portion of an atmosphere and a second portion of the atmosphere;

means for measuring the set of RSs;

means for calculating at least one of a set of ionosphere delay rates or a set of rates of total electron content (ROTs) based on the measured set of RSs;

means for selecting a first subset of the calculated set of ionosphere delay rates based on the first subset being less than or equal to a threshold or selecting a second subset of the calculated set of ROTs based on the second subset being less than or equal to the threshold;

means for calculating, using at least one of the selected first subset of the calculated set of ionosphere delay rates or the selected second subset of the calculated set of ROTs, a first set of atmospheric delays associated with the first portion of the atmosphere and a second set of atmospheric delays associated with the second portion of the atmosphere; and means for calculating a location of the UE based on the measured set of RSs associated with at least one of the selected first subset of the calculated set of ionosphere delay rates or the selected second subset of the calculated set of ROTs, the calculated first set of atmospheric delays, and the calculated second set of atmospheric delays.

30. A non-transitory computer-readable medium storing computer executable code at a user equipment (UE), the code when executed by at least one processor causes the at least one processor to:

receive a set of reference signals (RSs) from a set of non-terrestrial network (NTN) nodes, wherein the set of RSs travel through a first portion of an atmosphere and a second portion of the atmosphere;

measure the set of RSs;

calculate at least one of a set of ionosphere delay rates or a set of rates of total electron content (ROTs) based on the measured set of RSs;

select a first subset of the calculated set of ionosphere delay rates based on the first subset being less than or equal to a threshold or select a second subset of the calculated set of ROTs based on the second subset being less than or equal to the threshold;

calculate, using at least one of the selected first subset of the calculated set of ionosphere delay rates or the selected second subset of the calculated set of ROTs, a first set of atmospheric delays associated with the first portion of the atmosphere and a second set of atmospheric delays associated with the second portion of the atmosphere; and calculate a location of the UE based on the measured set of RSs associated with at least one of the selected first subset of the calculated set of ionosphere delay rates or the selected second subset of the calculated set of ROTs, the calculated first set of atmospheric delays, and the calculated second set of atmospheric delays.

* * * * *